US006259977B1

(12) United States Patent
Mayer et al.

(10) Patent No.: US 6,259,977 B1
(45) Date of Patent: Jul. 10, 2001

(54) AIRCRAFT FLIGHT DATA ANALYSIS SYSTEM AND METHOD

(75) Inventors: Thomas J. Mayer; Katta M. Vamsi; Richard E. Pineo; Ken S. Kozman, all of Austin, TX (US)

(73) Assignee: Austin Digital Inc., Austin, TX (US)

( * ) Notice: Subject to any disclaimer, the term of this patent is extended or adjusted under 35 U.S.C. 154(b) by 0 days.

(21) Appl. No.: 09/193,572

(22) Filed: Nov. 17, 1998

(51) Int. Cl.[7] ....................................................... G06F 7/70
(52) U.S. Cl. ................................. 701/14; 360/5; 360/31; 73/489
(58) Field of Search ................................. 701/14, 24, 25, 701/34; 360/5, 31; 73/489

(56) References Cited

U.S. PATENT DOCUMENTS 4,442,491 * 4/1984 Olhausen, Jr. ......................... 701/221

* cited by examiner

Primary Examiner—William A. Cuchlinski, Jr.
Assistant Examiner—Arthur D. Donnelly
(74) Attorney, Agent, or Firm—Taylor Russell & Russell; Gail M Taylor Russell

(57) ABSTRACT

An aircraft data analysis computer program and method that allows user-defined measurements to be made on a set of flight data obtained from a variety of sources. Post-flight measurement and trending analysis software provides a user configurable measurement system using user-defined measurement definitions for analyzing flight data from a variety of sources. Measurements that require nonsequential analysis of the sequential flight data file can be performed. Data from a variety of aircraft types, from a variety of flight data recorders and from other sources of flight data can be analyzed by translating the data into fleet-independent terms, so that the performance of different fleets or different aircraft types can be compared. The user can perform trending, characterization and statistical analyses on the flight data information. The results of the user-defined measurements are stored in a flight analysis database and may be viewed by the user in a variety of display formats.

72 Claims, 35 Drawing Sheets

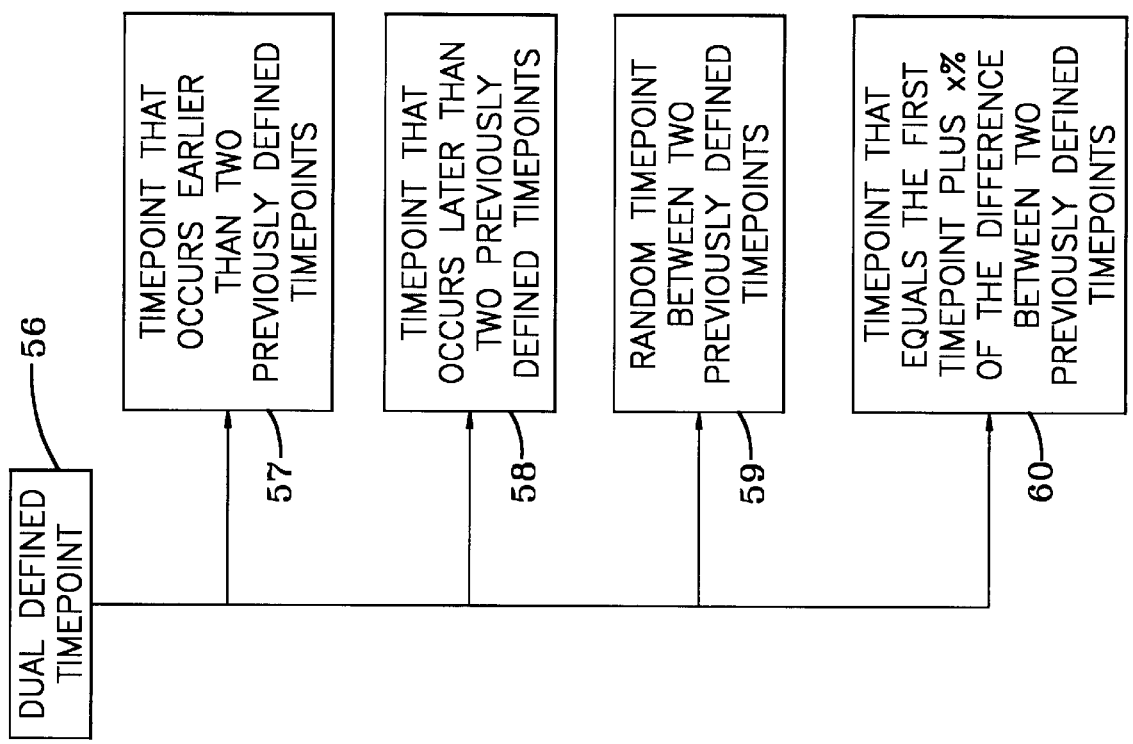

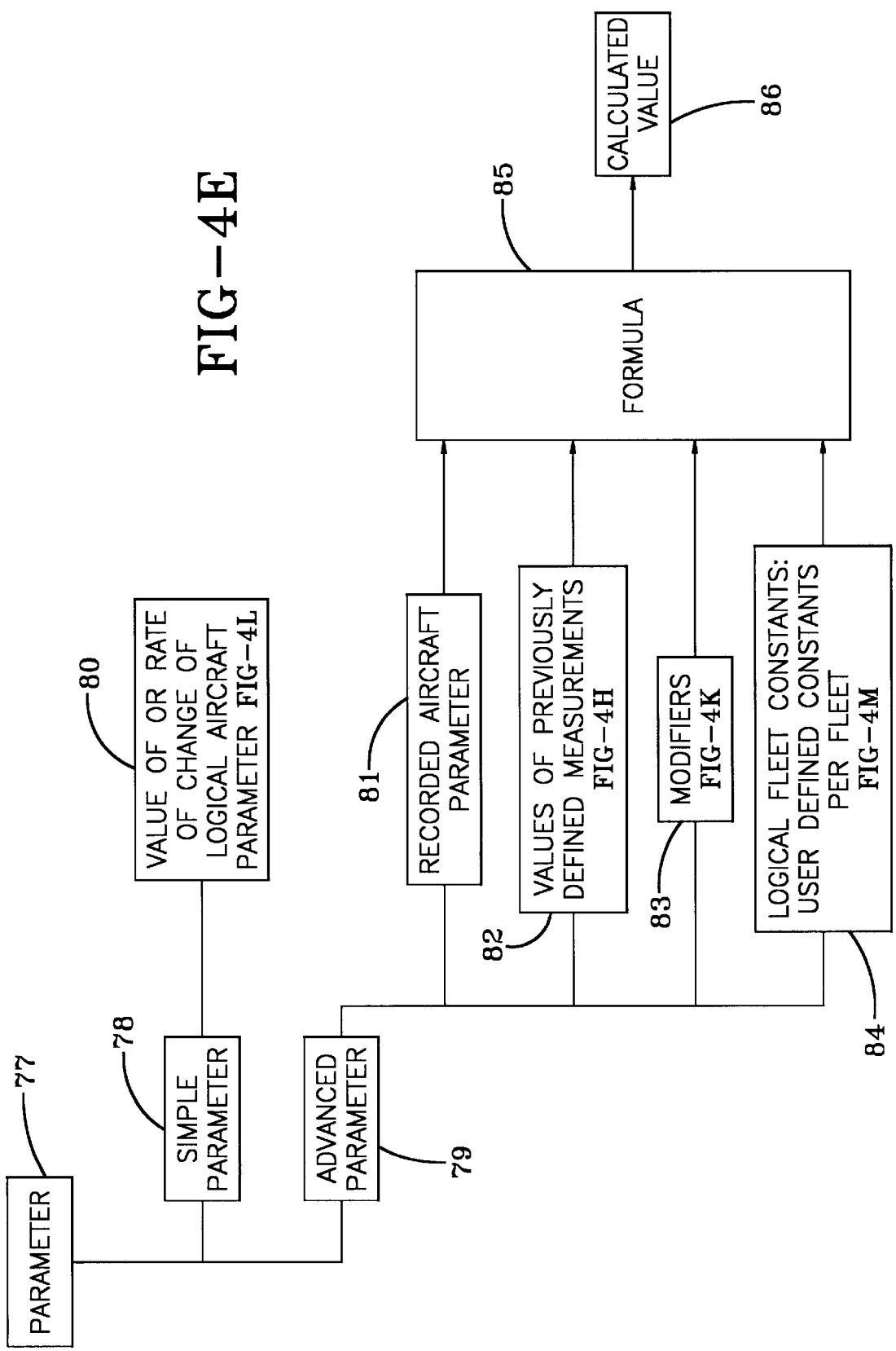

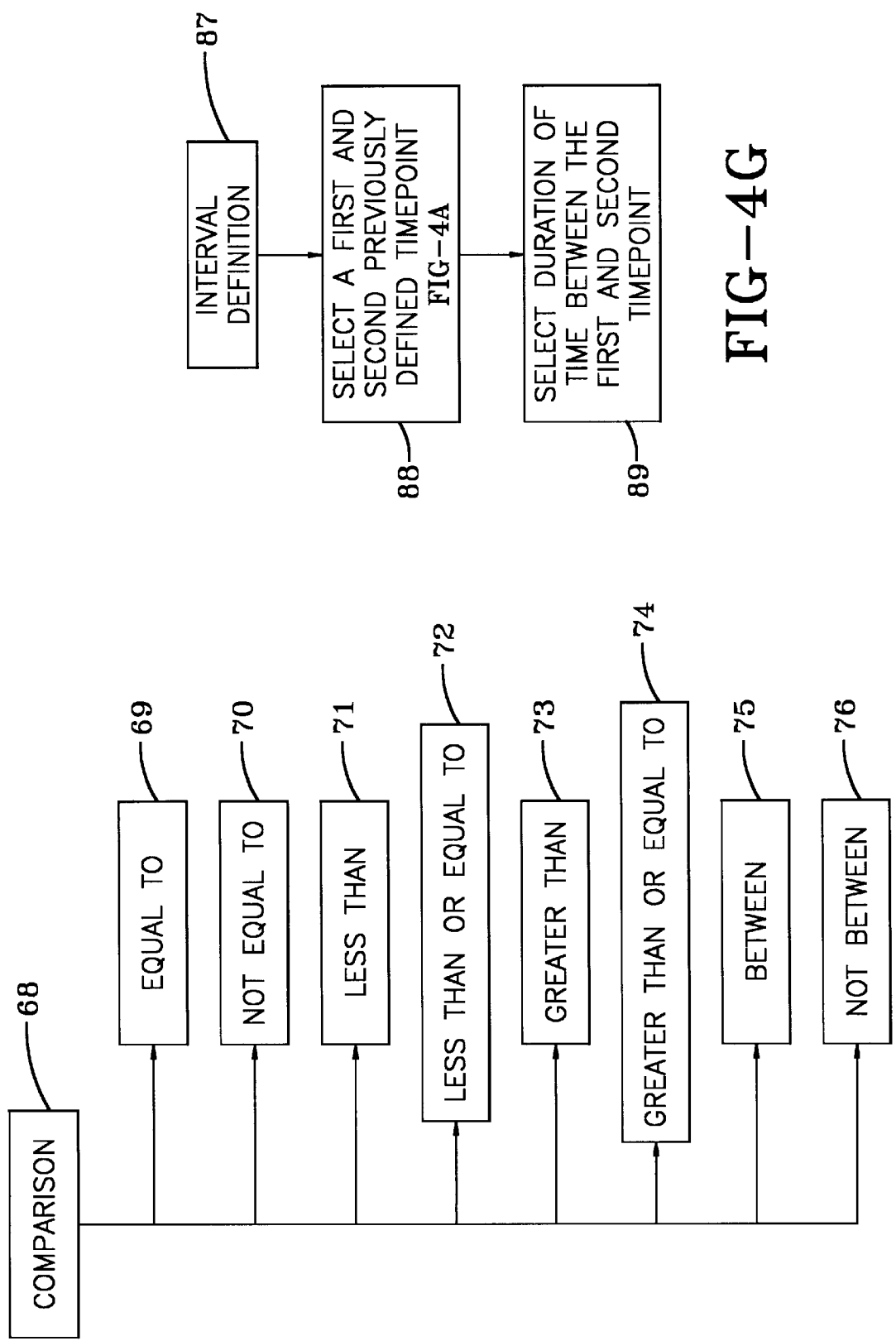

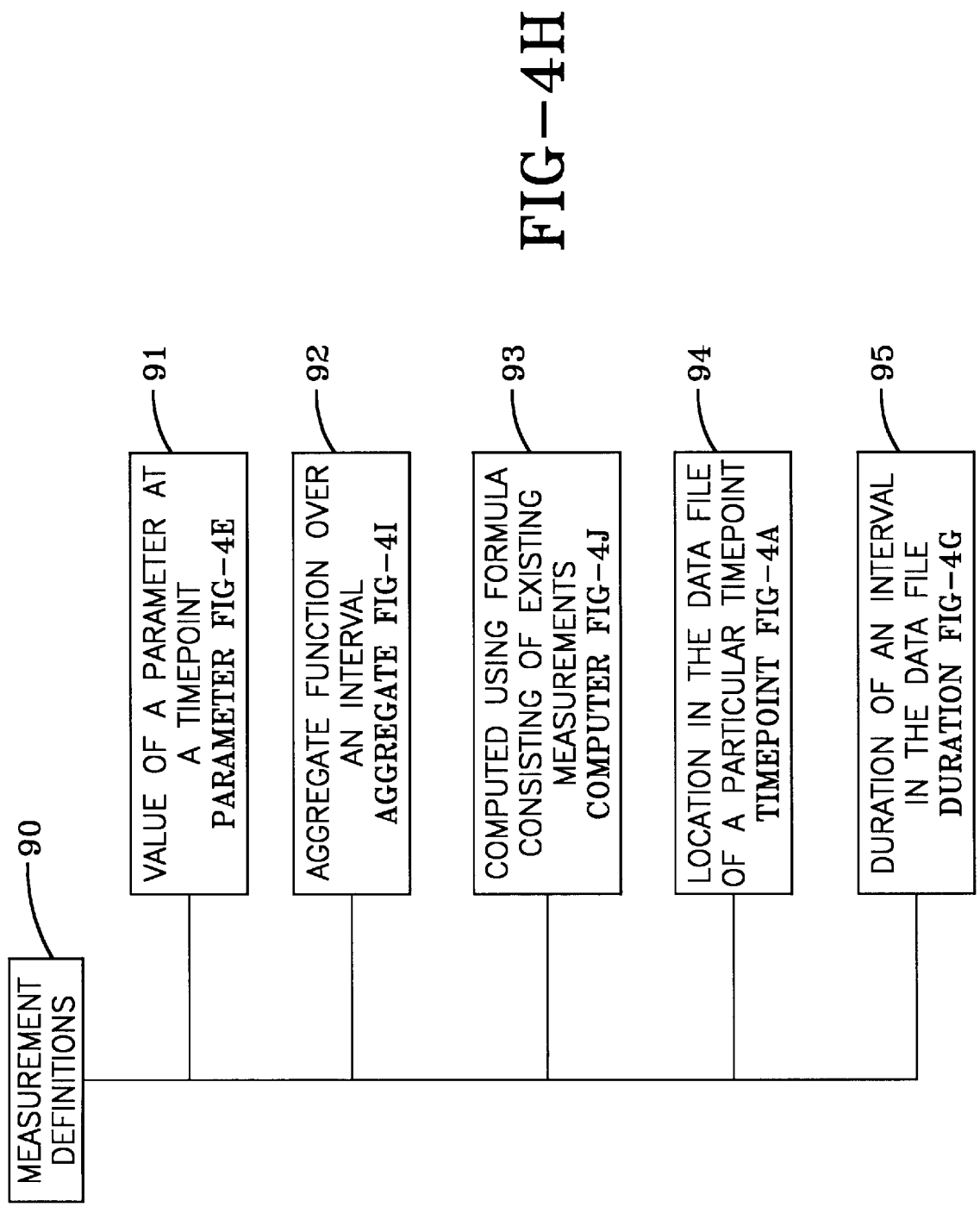

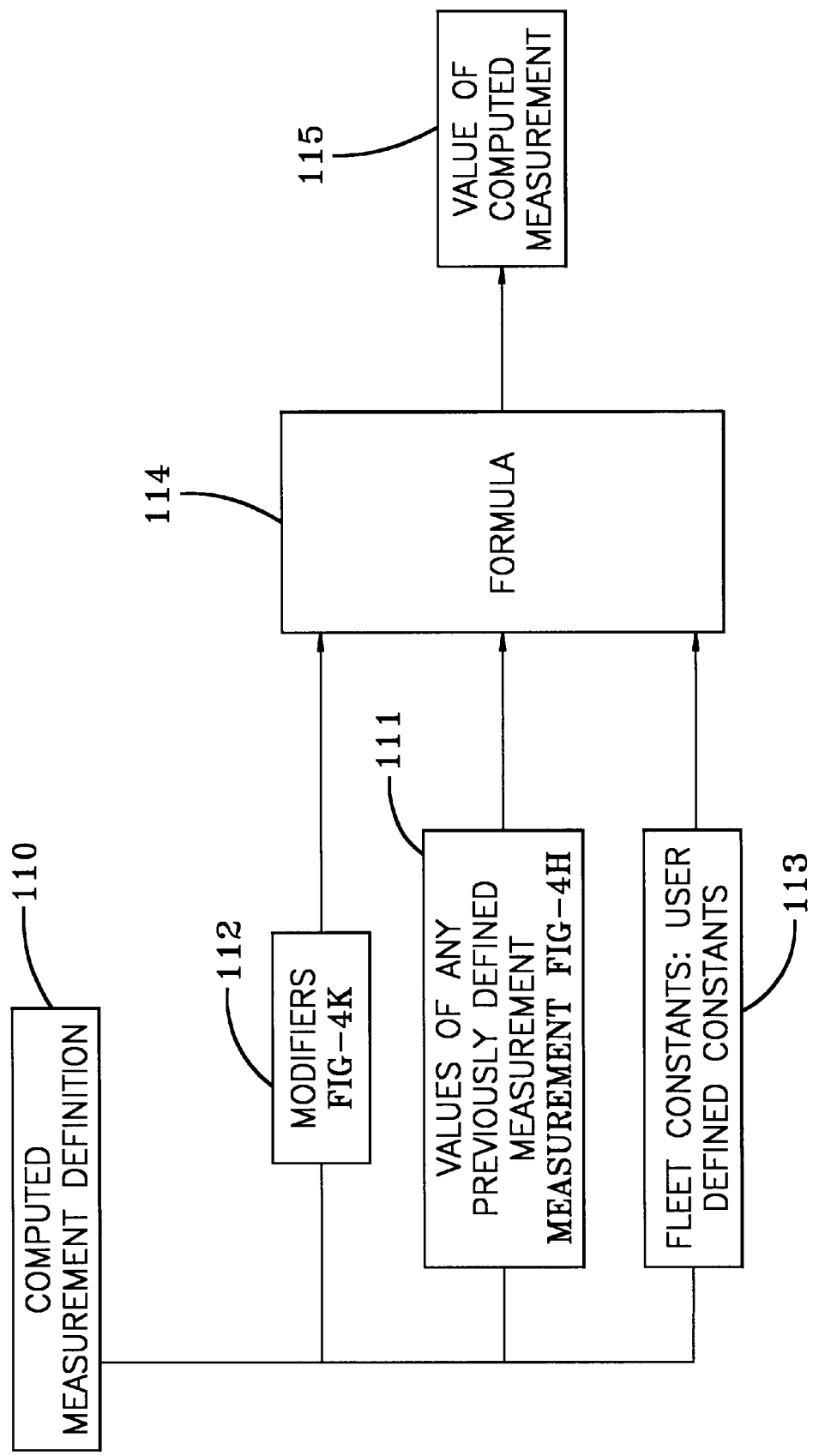

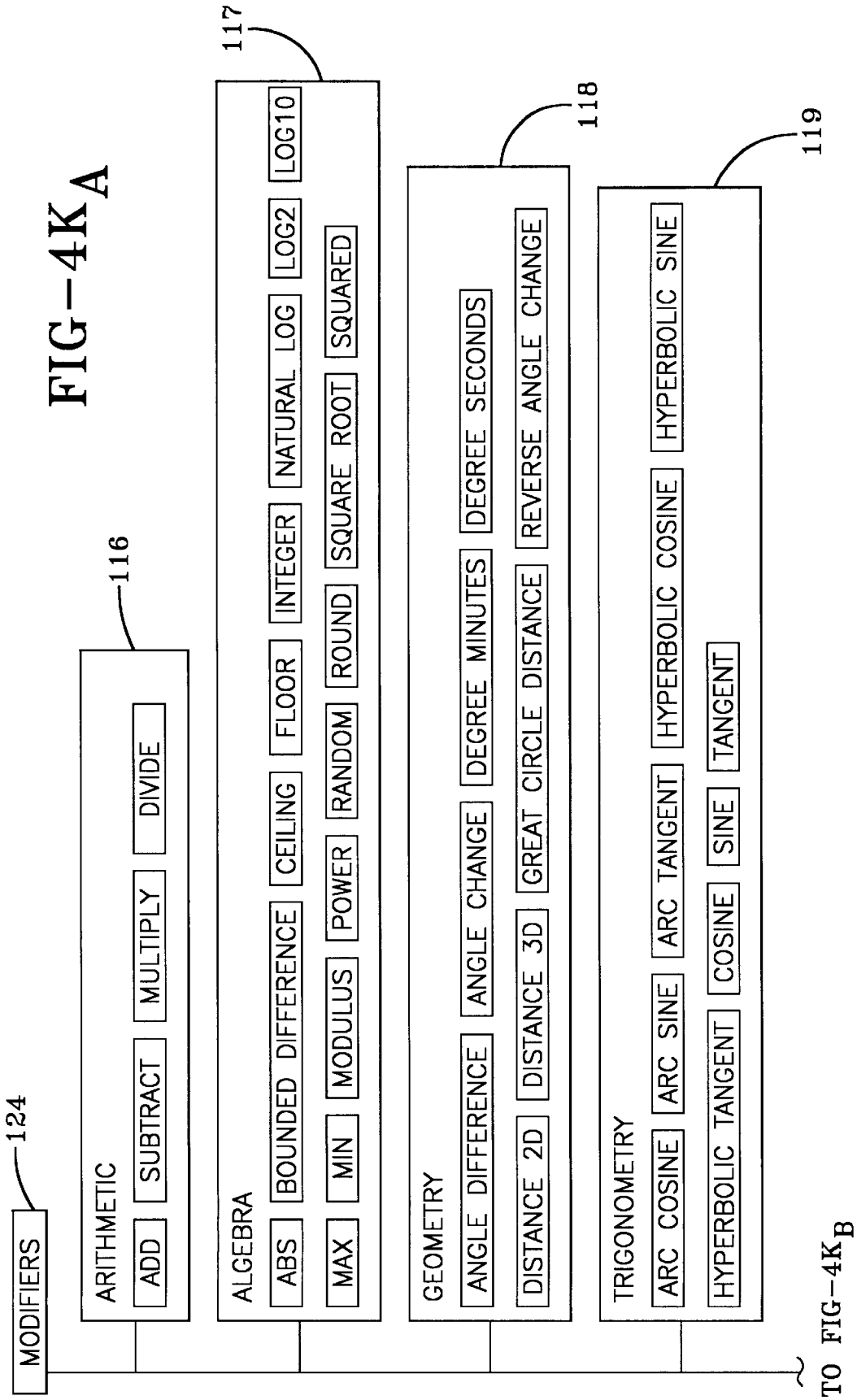
FIG-4K$_A$

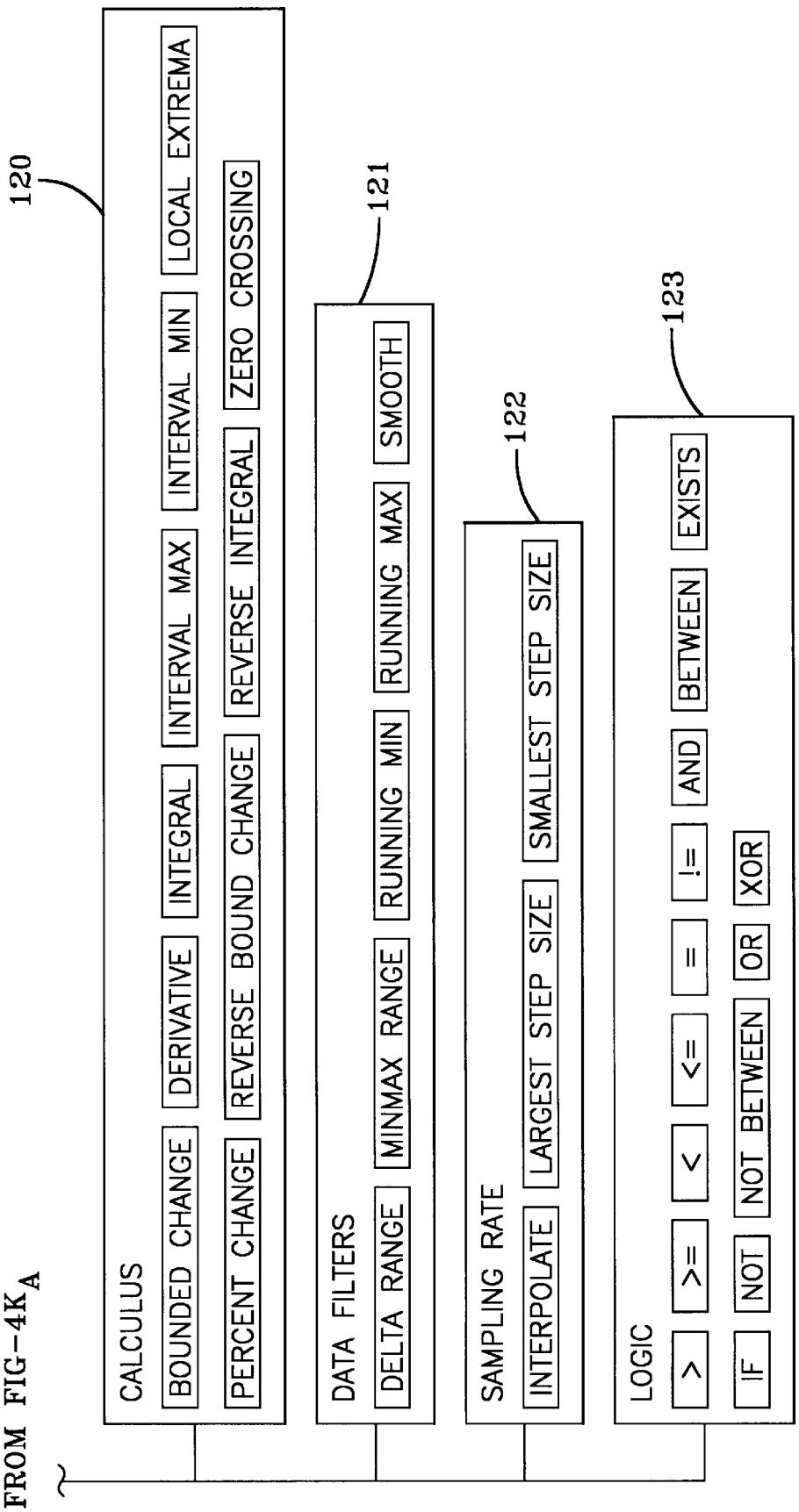
FIG-4K_B

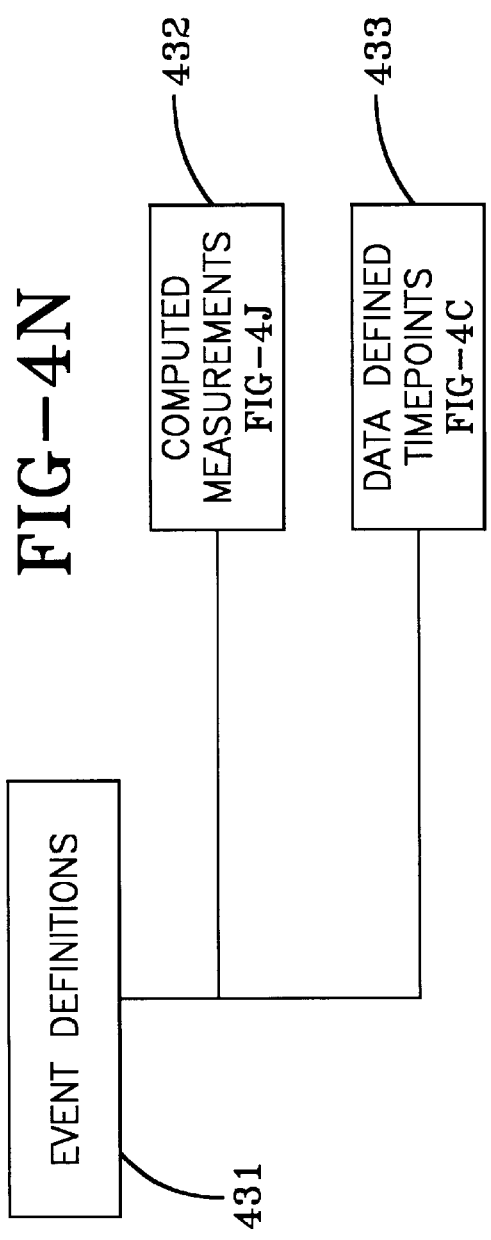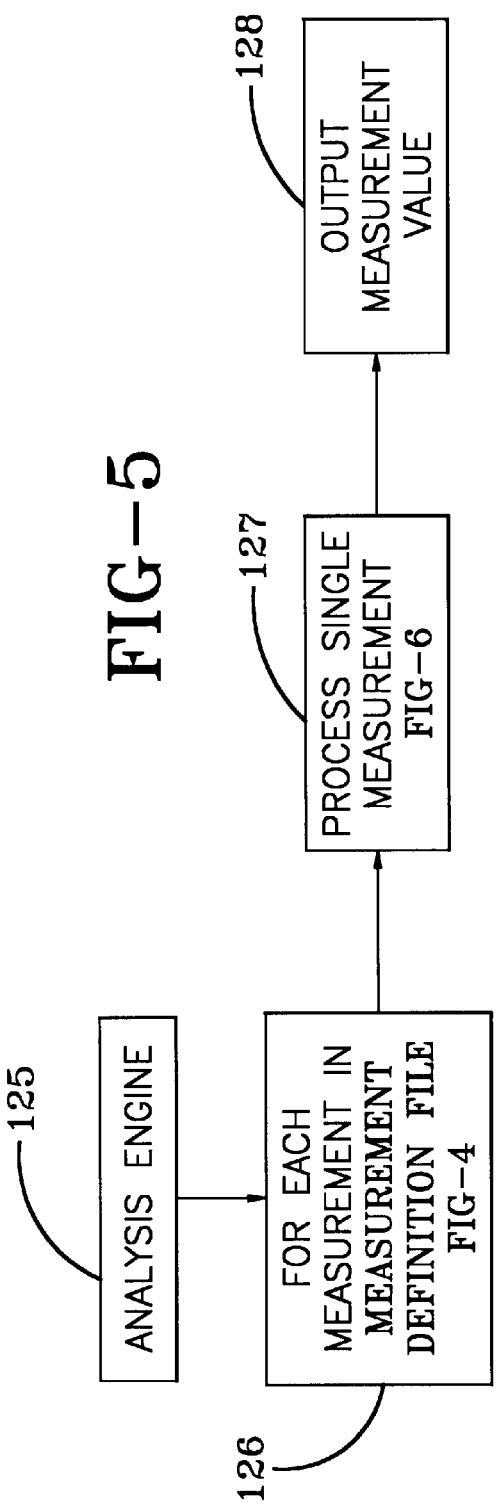

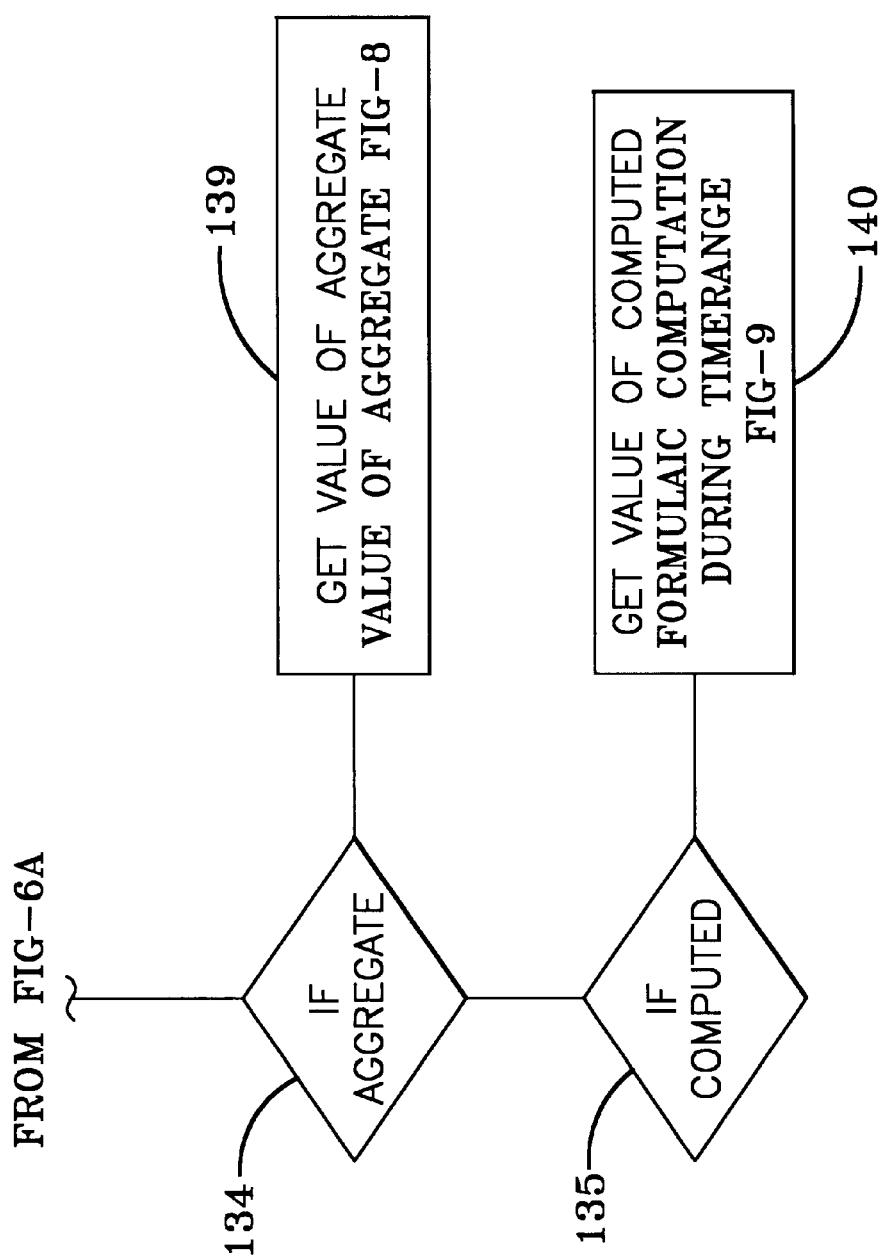

Edit Data Defined Timepoint

Description: d) last flap change

Interval: 1: approach interval

Condition flaps change Greater Than 2 for 2 seconds before a point in time

Edit Condition

Timepoint Location

○ Beginning of Condition
⦿ Ending of Condition

Select which condition when more than one

○ From First Occurrence of Condition
⦿ From Last Occurrence of Condition
Occurence Offset: 0

OK     Cancel

Edit Flight Parameter

Description: height above takeoff

Formula: (P:2) – (M:4)

| ID | Parameter |
|---|---|
| 0 | Latitude |
| 1 | Longitude |
| 2 | Pressure Altitude |
| 3 | Vertical Acceleration |
| 4 | GMT |
| 5 | Air~/Ground Switch |
| 6 | Mach Number |
| 7 | Thrust Reverses Deploy |
| 8 | Radio Altitude |
| 9 | Heading – Magnetic |
| 10 | Sync Error |
| 11 | Angle of Attack |
| 12 | Gross Weight |
| 13 | Roll |
| 14 | Pitch |
| 15 | N1 Left Engine |
| 16 | N1 Right Engine |
| 18 | N2 Right Engine |
| 19 | Longitudinal Acceleratio |
| 20 | EGT Left |
| 21 | Airspeed |
| 22 | EGT Right |
| 26 | Marker (Middle)~ |
| 27 | Ground Speed |

| ID | Measurement |
|---|---|
| 4 | Pressure Altitude at Takeoff |
| 5 | Gear Retraction Height |
| 8 | Slat Retraction Height |
| 12 | Time to climb 1000 ft |
| 29 | air speed at gear retraction |
| 30 | air speed at slat retraction |

| ID | Constant |
|---|---|
| 1 | Maximum Engine Temperature |
| 2 | Minimum Cruise Altitude |
| 4 | Feet from radio altimeter to tail |
| 5 | Passenger Capacity |

Modifiers:
- ⊞ Arithmetic
- ⊞ Algebra
- ⊞ Geometry
- ⊞ Trigonometry
- ⊞ Calculus
- ⊞ Logic
- ⊞ Data Filters
- ⊞ Sampling Rate
- ⊞ Distance Constants
- ⊞ Velocity Constants
- ⊞ Mass Constants
- ⊞ Air Based Constants
- ⊞ Trigonometry Constants
- ⊞ Miscellaneous Constants OK  
Cancel  
Simple

AIRCRAFT FLIGHT DATA ANALYSIS SYSTEM AND METHOD

BACKGROUND

The invention relates generally to aircraft flight data analysis systems. More particularly, the invention relates to aircraft data analysis systems that make user-defined measurements on a set of flight data obtained from a variety of sources and post-flight measurement and trending analysis software that provide a user configurable measurement system for analyzing flight data from a variety of sources.

Data recorders on board modem aircraft record information about hundreds or thousands of operational parameters, such as ground speed, pitch and altitude at a rate of multiple times per second. The information thus collected is of great value to persons concerned with safety, aircraft maintenance, crew training, and other aspects of aircraft operation. However, the amount of information recorded during a single flight exceeds the analytical ability of even a skilled analyst. The amount of information collected from all the aircraft in a commercial fleet over a period of several months is staggering. Computer-assisted methods of analyzing flight data have been developed by airlines, government entities responsible for flight safety, and by others responsible for some aspect of aircraft operation. These computer assisted methods have to attempted to analyze the data for a number of purposes, including reducing accident rates and producing cost savings.

Traditional analysis has focused on sequentially searching recorded data from a single flight for an event or events of interest. An event is defined essentially as an out of tolerance instance where the value of one or more parameters exceeds acceptable limits as defined by safety considerations or the standard operating procedures of the aircraft operator. Existing flight data analysis systems operate by sequentially searching recorded data for a single flight for an event or events of interest and only generate a report (also called a "log") if such an event occurred. However, it is often useful to know the normal range of a specific parameter over many flights, independently of whether or not an event has occurred. Information about normal ranges of a given value over many flights, where the normal range of the value is a function of actual operations rather than a specified number or limit, is not easily accessible using given methods of flight data analysis. It is also often useful to know the normal range of a specific parameter during multiple flights of a number of airplanes of the same type of aircraft also called a "fleet"). For example, it may be useful to know the average aircraft speed during selected time points during takeoff for multiple flights of a particular aircraft or for a particular type of aircraft. It may also be useful to know that same information for other aircraft within the same fleet. These and other types of analyses are not provided for in existing flight data analysis systems.

In addition, existing flight data analysis systems are not easily configured by users and instead often require software changes to be implemented by the software manufacturer whenever a user wants to perform a measurement not currently provided for in the software data analysis program. The user is generally not allowed to configure the needed measurement just prior to or at the time of the time of flight data analysis. This severely limits the capability of existing flight data analysis systems to evolve as the flight data analysis needs and parameters change.

Also, in existing flight data analysis systems, the analysis is specified separately for each fleet (aircraft type). This makes it difficult to compare the analysis results between different fleets (aircraft types). Additionally, the work of setting up the system must be repeated for each fleet (aircraft type).

SUMMARY

The present invention solves these problems by providing a computer implemented, hardware independent flight data analysis system and method that performs analysis on flight data from one or more flight data sources. The invention allows users to perform trending, characterization and statistical analyses on flight data information. This is possible because the flight data analysis measurements are performed independently of whether or not an event has occurred. The invention also provides for the saving of the flight data analysis results and allows further analysis of those results.

The present system and method permits is easily configurable by the user. It permits users to perform user-defined, fully configurable measurements utilizing any of more than sixty basic mathematical and logical operators included as building blocks. The user can also create additional basic operators. User-created measurements can be stored and automatically applied to new flight data or to the stored results of previous analyses.

To permit flexibility in performing analysis on the flight data, the invention incorporates a description language that allows the user to build user-defined measurement definitions in a fleet (aircraft type) independent manner. These user-defined measurement definitions may be expressed in terms of time points, intervals, measurements and events relative to the stream of data recorded by onboard recorders. This description language enable users to perform measurements that require nonsequential analysis of the sequential flight data file.

The present system and method also performs trending, characterization, and statistical analysis on databases containing collections of results of earlier analyses. In addition, the system the stores and manages pools of flight data from individual flights such that users can perform measurements upon that flight data for an indefinite period of time after completion of the flight. Data from a variety of aircraft types, from a variety of flight data recorders and from other sources of flight data can be analyzed by translating the data into fleet-independent terms, so that the performance of different fleets or different aircraft types can be compared. Users can choose to analyze the entire flight data file or can define a segment of the flight data file to be analyzed from the entire flight set of flight data.

The present invention comprises a computer program for post-flight data analysis of aircraft flight data comprising the steps of: using recorded flight data containing data for one or more flights of interest, analyzing the recorded flight data using user defined measurement definitions and saving the results for the flight of interest. The computer program further comprises repeating the analysis for different sets of user defined measurements and saving each result in a flight analysis data base. The user defined measurements may be defined by a user prior to analyzing the flight of interest. Alternatively, the user defined measurements may be stored in a measurement definition file. The recorded flight data is preprocessed and stored in a flight database. The preprocessing comprises segmenting the data into individual flights, identifying the phases of flight, deidentifying the individual flights and determining airport locations for take off and landing. These results may be stored in a flight database.

The user defined measurements may be selected from the group consisting of timepoint definitions, interval definitions, measurement definitions and event definitions.

The timepoint definitions may be selected from the group consisting of phase of flight timepoint, relative timepoint, dual defined timepoint, data defined timepoint and file defined timepoint. The timepoint definitions may comprise defining a timepoint relative to a phase of flight specified by the user. The timepoint definitions may also comprise a timepoint to be defined relative to a single selected timepoint. Alternatively, the timepoint definitions comprise a timepoint to be defined relative to first and second specified timepoints and the timepoint to be defined may be selected from the group consisting of: a timepoint at an earlier time than the first and second selected timepoints, a timepoint at a later time than the first and second selected timepoints, a timepoint at a randomly occurring time at a time between the first and second selected timepoints, and a timepoint at a specified interval between the first and second selected timepoints.

The timepoint definitions may comprise a data defined timepoint or a timepoint to be defined relative to a selected condition that occurs during a specified interval of time. The selected condition occurs when a value of a parameter satisfies a comparison during a time range specified by the user.

A parameter may comprise a simple parameter that is a value of a logical aircraft parameter. The logical aircraft parameter comprises a mathematical formula. Alternatively, the logical aircraft parameter is not specified to indicate the logical aircraft parameter does not exist for the specified aircraft type. Alternatively, the parameter may comprise a simple parameter that is a rate of change of a recorded aircraft parameter. The parameter may be an advanced parameter comprising a calculated value. The calculated value may comprise inputting recorded aircraft data, user defined measurement definitions, modifiers and logical fleet constants into a formula to generate the advanced parameter. The logical fleet constants comprise a specified value for an aircraft type. Alternatively, the logical fleet constants are not specified to indicate the logical fleet constant does not exist for a specified aircraft type.

The user defined measurement definitions may comprise a value of a parameter at a timepoint, an aggregate function over an interval, or a computed measurement. The computed measurement may comprise inputting previously defined measurements, modifiers and logical fleet constants into a formula to generate the computed measurement. The user defined measurements may comprise a location in the data of a particular timepoint or a duration of an interval in the recorded flight data.

The timepoint definitions may comprise a time point selected from the group consisting of the start or end of the flight of interest in the data base of flight data measurements. The interval definitions may comprise selecting an interval of time between first and second previously defined timepoints. The measurement definitions may comprise parameter measurements, aggregate measurements, computed measurements, timepoint measurements and duration measurements.

An event definition may be a Boolean value computed measurement or a data defined timepoint.

The parameter measurement may comprise the value of a parameter at a specified timepoint or the value of an aggregate function over a specified interval. The aggregate function may be selected from the group consisting of average rate of change, linear fit-offset, linear fit-slope, maximum value, mean value, minimum value, standard deviation, time of maximum, time of minimum, value at an end of an interval, or value change over an interval.

The computed measurement may be computed by building a formula using values of any previously defined measurement, aircraft logical fleet constants and a set of mathematical and logical modifiers.

The timepoint measurement may be a timepoint within the flight analysis database. The interval definition may be a duration of time between a first and second timepoint. The modifiers may be selected from the group consisting of: arithmetic, algebraic, geometric, trigonometric, calculus, data filters, sampling rate and logical. The analyzing step may comprise processing each user defined measurement contained in a measurement file and outputting a measured value.

For a particular flight of interest, in the analyzing step, if the user measurement is a timepoint, the value of timepoint may be saved for the flight of interest in a flight analysis data base.

The present invention comprises a method for analyzing recorded aircraft flight data, in a computer program running on a computer processor, comprising the steps of: providing recorded flight data, providing user defined measurements, analyzing the recorded flight data using the user defined measurement criteria, collecting the results and storing the results in a flight analysis database and displaying the results to the user. The recorded fight data is processed and stored in a flight database. The flight data may be for one or more flights of a same aircraft, for one or more flights of different aircraft of a same aircraft type or for one or more flights of different aircraft of a different aircraft type.

The user may perform interactive analysis of the flight analysis database. The interactive analysis comprises: using selected user defined measurement criteria, analyzing the data in the flight analysis database and generating a new set of results, storing the results in the flight analysis database, allowing the user to selectively view the results and exporting the results in a user-defined format.

The user can view the results as a histogram or can view the results in three dimensions. The user may selectively view the results by the value of the data, the date of the data and the set of the data. The set of the data can be characterized by aircraft fleet, aircraft identification, aircraft takeoff location and aircraft landing location. The value of the data comprises a selected measurement, percentage of error and hours of flight. The user can view the results for a single flight. The user-defined format comprises generating a report of the results selected from the group consisting of the entire set of results or a current view of the results displayed to the user. The results in a user-defined format may comprise generating a spreadsheet of the results. The user defined measurement criteria comprises determining constraints to be applied to the flight database. The constraints comprise selecting a filter from the group consisting of a measurement filter, a date filter, a set filter, and a record number filter. The measurement filter is selected from the group consisting of no filter, measurement does not exist filter, exclude a measurement that does exist filter, measurement is less than or equal filter, measurement is greater than or equal filter, measurement is between a value, measurement is not between a value, and measurement is within a value range. The set filter is selected form the group consisting of no filter, equal to a selected set, including a selected set or excluding a selected set. The record number filter is selected from the group consisting of no filtering, record number equal to filter, record number greater than filter, record number greater than filter, record number between selected record numbers filter, record number not between selected record numbers filter and record number between a range of values filter.

The present invention comprises computer executable software code stored on a computer readable medium, the code for performing post-flight data analysis of aircraft flight data comprising: code for using recorded flight data containing data for one or more flights of interest, for one or more flights of interest, code for analyzing the recorded flight data using user defined measurement definitions and code for saving the results for the flight of interest. The computer executable software code further comprises analyzing the saved results for the flight of interest in the flight analysis database using a different set of user defined measurements and saving results using the different set of user defined measurements for the flight of interest in the flight analysis data base.

BRIEF DESCRIPTION OF THE DRAWINGS

These and other features, aspects, and advantages of the present invention will become better understood with regard to the following description, appended claims, and accompanying drawings where:

FIG. 4B is a flow diagram for defining a dual defined timepoint.

FIG. 4E is a flow diagram for determining a parameter.

FIG. 4F is a flow diagram for determining a comparison.

FIG. 4G is a flow diagram for the definition of an interval by a user.

FIG. 4H is a flow diagram for the definition of a measurement by a user.

FIG. 4J is a flow diagram for the definition of a computed measurement.

FIG. 4K is a flow diagram for defining modifiers is shown.

FIG. 4N is a flow diagram for defining an event definition.

FIG. 5 is a flow diagram showing the analysis engine processing.

FIG. 16 shows the graphical user interface for determining a data defined timepoint (FIG. 4C).

FIG. 17 shows the graphical user interface for determining an advanced parameter (FIG. 4E).

DETAILED DESCRIPTION

Figure 1:
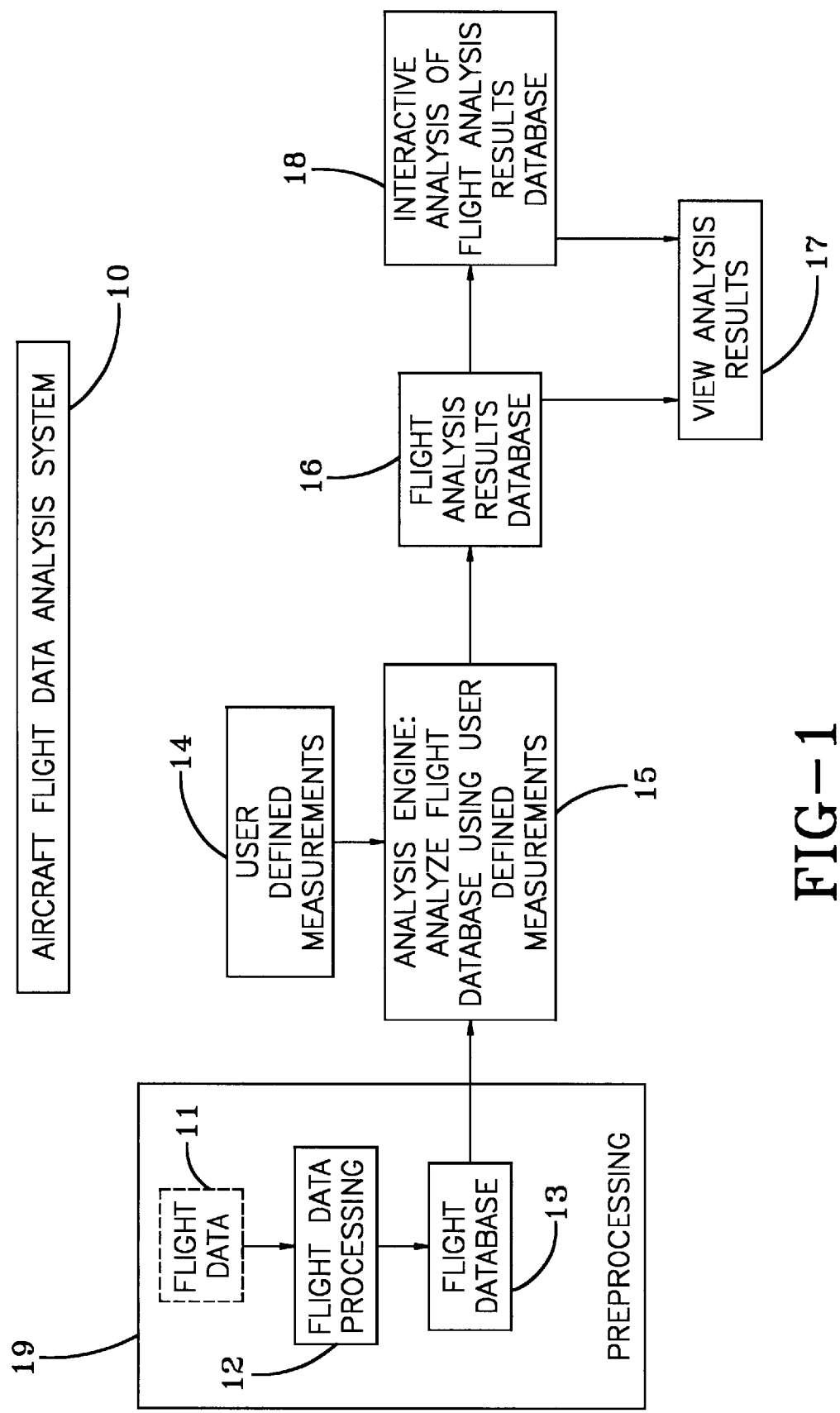
FIG. 1 is a high-level system block diagram of a preferred embodiment of the flight data analysis system.

Turning now to FIG. 1, a high-level system block diagram of a preferred embodiment of the aircraft flight data analysis system 10 in accordance with the present inventive concept is shown. Flight data 11 is obtained from an aircraft, a flight simulator or some other source of flight data. The flight data 11 is preprocessed 12, that is it is formatted and prepared so that it can be analyzed by the aircraft flight data analysis system and the processed flight data is stored in an appropriate format in a flight database 13. This pre-analysis processing 19 may be accomplished by the aircraft flight data analysis system 10 itself or may be accomplished separately and not included in the aircraft flight data analysis system 10. The user-defined measurements 14 are a set of measurements to be performed on the flight database. These user defined measurements can be generated by the user at the time the flight database analysis is to be performed or can be copied from a previously defined set of stored user-defined measurements. The system then performs an analysis 15 of the flight database 13 using the user defined measurements 14. The results of this flight analysis are saved in a flight analysis database 16. The analysis results may be viewed by the user 17. The user may also perform interactive analysis of the flight analysis database 18. In the interactive analysis the user can further constrain the analysis of the flight analysis data base results 16 and can select the format for viewing the analysis and for exporting the results.

Figure 2:
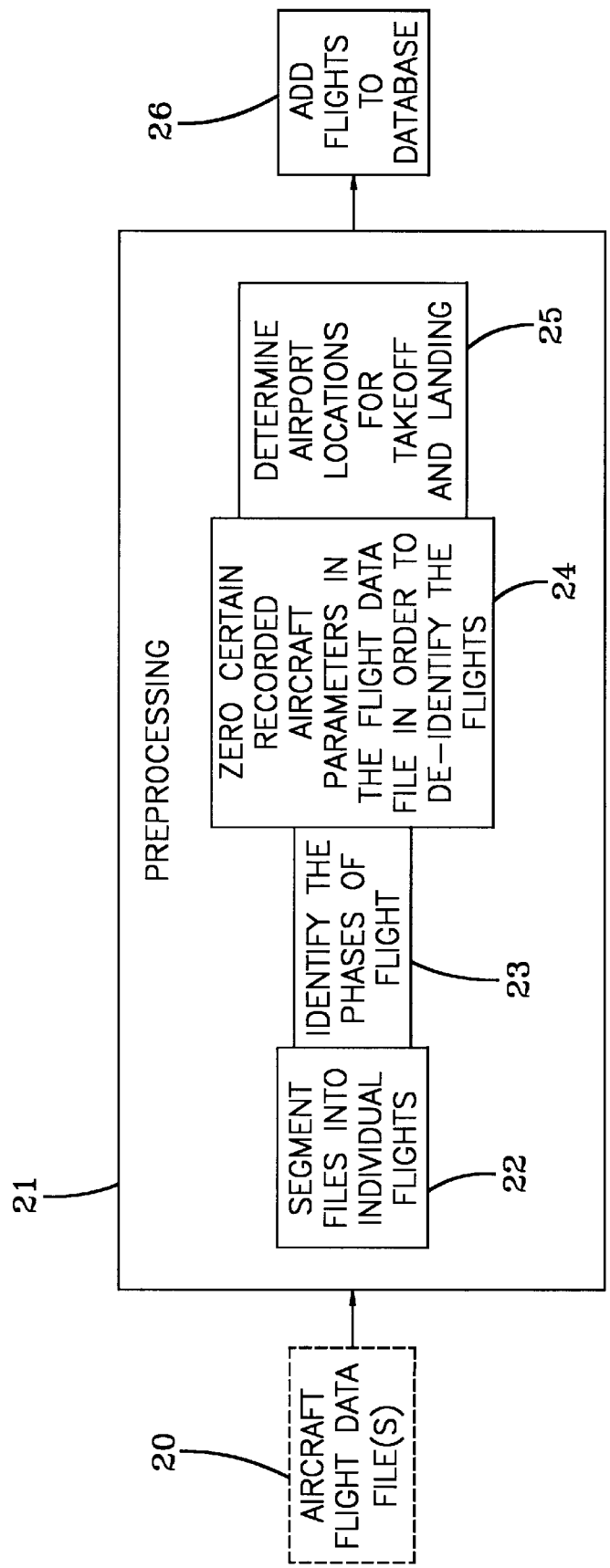
FIG. 2 is a block diagram illustrating the preprocessing function of FIG. 1.

FIG. 2 is a block diagram illustrating the preprocessing function 19 of FIG. 1. Aircraft flight data files 20 are obtained from the aircraft, a flight simulator or some other source of aircraft flight data. A preprocessing function 21 segments the aircraft flight data 20 into files representing individual flights 22. The phases of flight are identified 23. If desired, certain recorded aircraft parameters in the flight data file may be deleted in order to deidentify the specific flight 24. Deidentification may be done to hide sensitive information that is not pertinent to the present analysis. The airport locations for takeoff and landing are determined 25 automatically by comparing the altitude and longitude recorded during takeoffs and landings with a list of airports and their locations stored in a table. The invention translates incoming information into a standard format, thereby permitting comparison among flight data recorded in different formats. The preprocessed flight data is now added to the database of flights 26. If new flights are added, a new flight record (1 to N) for each flight is created and the translated flight data for that flight is stored in the new flight database 26. Old flights may be discarded from the flight database 26 in whole or in part as defined by the user. This allows flight analysis to be performed on whole flights or on portions of flights.

Figure 3:
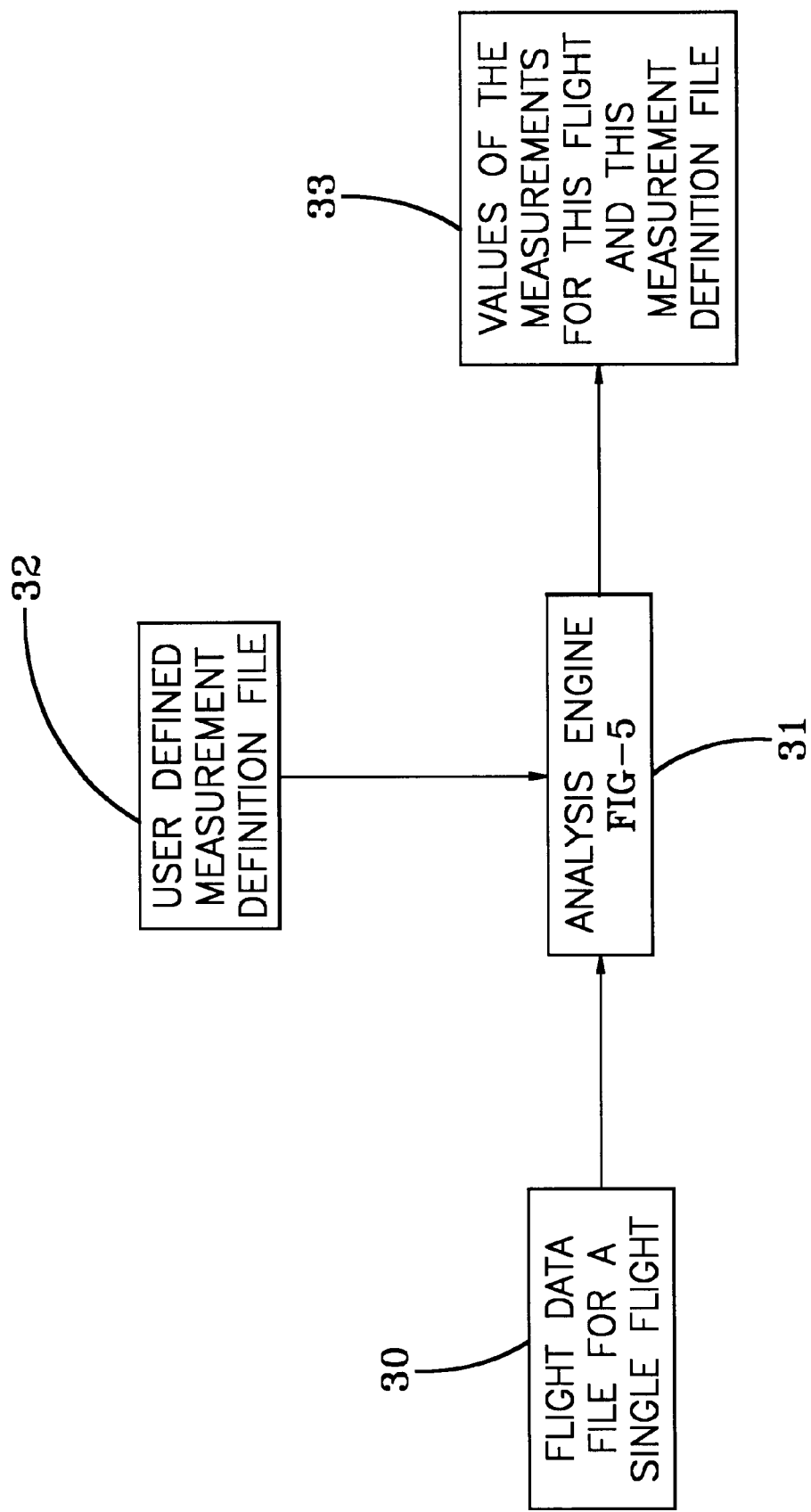
FIG. 3 is block diagram illustrating the user defined measurements and analysis engine processing for a single flight.

FIG. 3 is block diagram illustrating the user defined measurements and analysis engine processing for a single flight. In FIG. 3, flight data for a single file is input 30 and user-defined measurement definition file data 32 are input to an analysis engine 31 which computes the values of the measurements 32 for the particular flight of interest using the user-defined measurement definitions 32.

Figure 4:
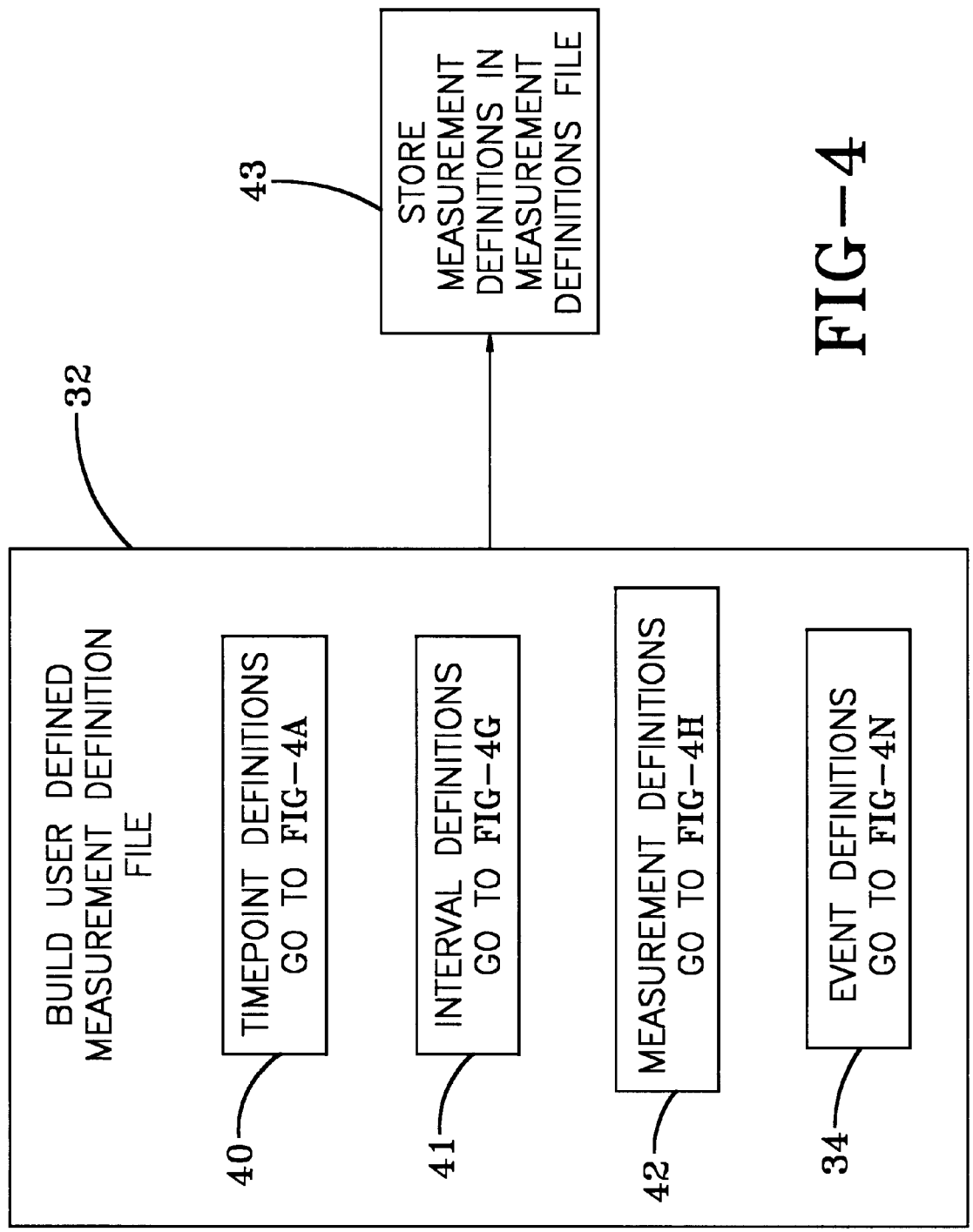
FIG. 4 shows a block diagram of building the user-defined measurement definition file 32.

FIG. 4 shows a block diagram of building the user-defined measurement definition file 32. The user-defined measurement definition file 32 is built by a user utilizing a measurement description language that permits fully user configurable searches. The user can choose to measure a variety of information and the user is given a great amount of flexibility, particularly in that the user can define a measurement formula or value to be computed using the available flight data. Timepoint definitions 40, interval definitions 41, measurement definitions 42 and event definitions 34 may be specified as discussed below. After the definitions are defined, they are stored in a measurement definition file 43.

Figure 4A:
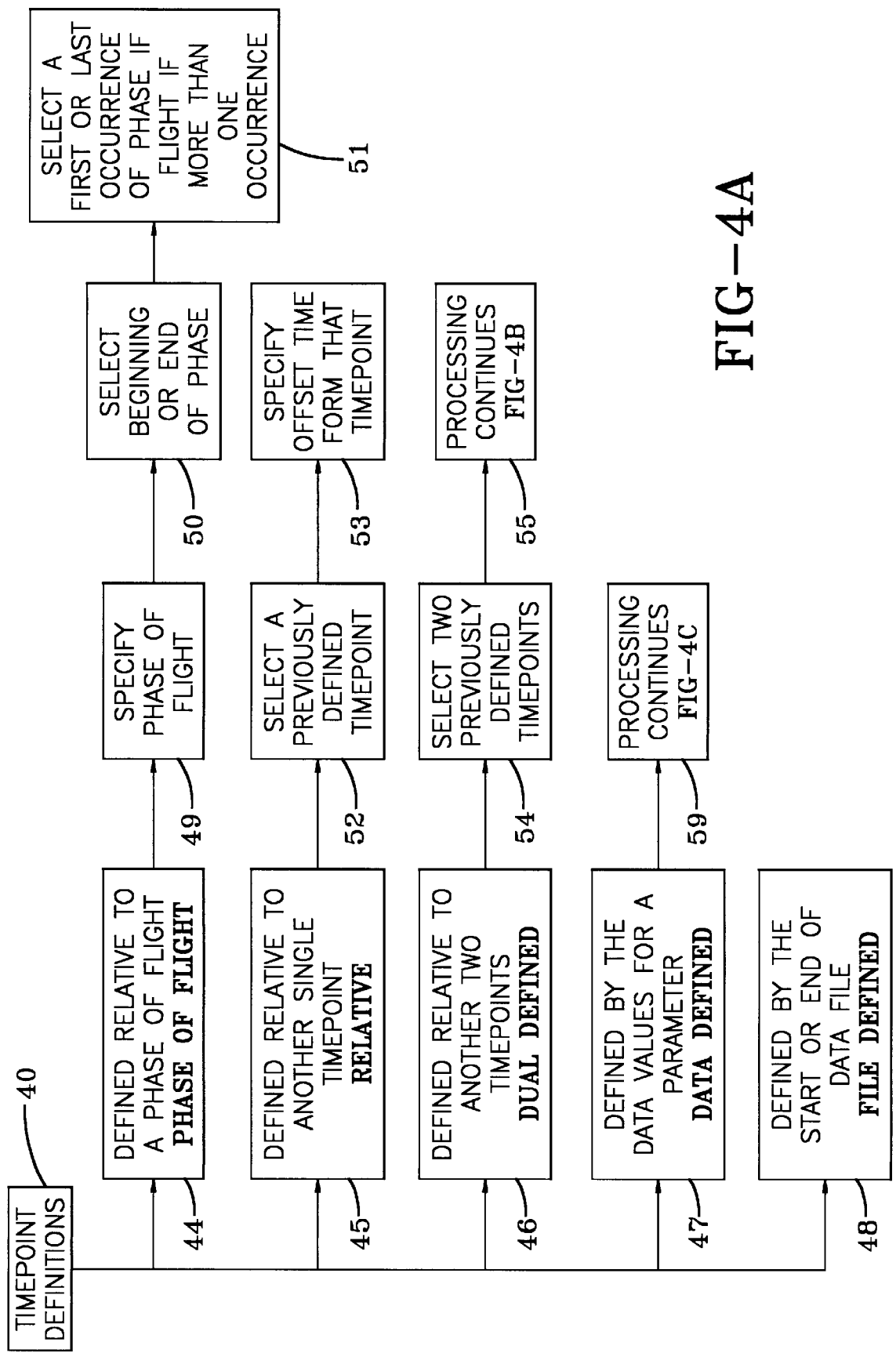
FIG. 4A is a flow diagram showing the timepoint definitions.

FIG. 4A is a flow diagram showing the timepoint definitions. In FIG. 4A, timepoint definitions 40 may be defined relative to a phase of flight 44, relative to another single timepoint 45, dual-defined (relative to two timepoints) 46, data-defined (defined by the data values for a parameter of interest) 47, or file-defined (defined by the start or end of a data file) 48. If a phase of flight timepoint 44 is specified, the user specifies the desired phase of flight 49, selects a beginning or end of phase 50 and if there is more than one phase, whether the timepoint should be defined for the first or last occurrence of the phase 51. If a timepoint relative to another single timepoint 45 is specified, the user has selected a previously defined timepoint 52 and then defines the new timepoint as an offset time 53 from that previously defined timepoint 52. If a dual defined timepoint is specified 46, the user selects two previously defined timepoints 54 and then defines the dual defined timepoint 55 as shown in FIG. 4B.

Turning now to FIG. 4B, a flow diagram is shown for defining a dual defined timepoint. The dual defined timepoint 56 may be one that occurs earlier than both specified timepoints 57, one that occurs later than both specified timepoints 58, a random timepoint between the two timepoints 59 or a timepoint which is the first timepoint plus a certain percentage of the difference between the two timepoints 60 (for example, a time point midway between the two points would be specified as 50%).

Figure 4D:
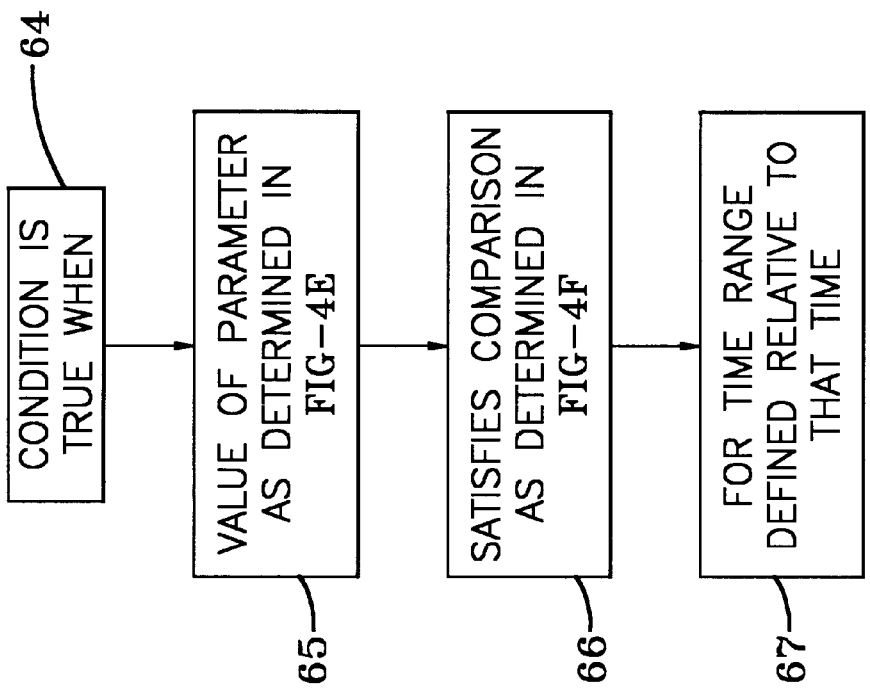
FIG. 4D is a flow diagram for determining when a condition is true.
Figure 4C:
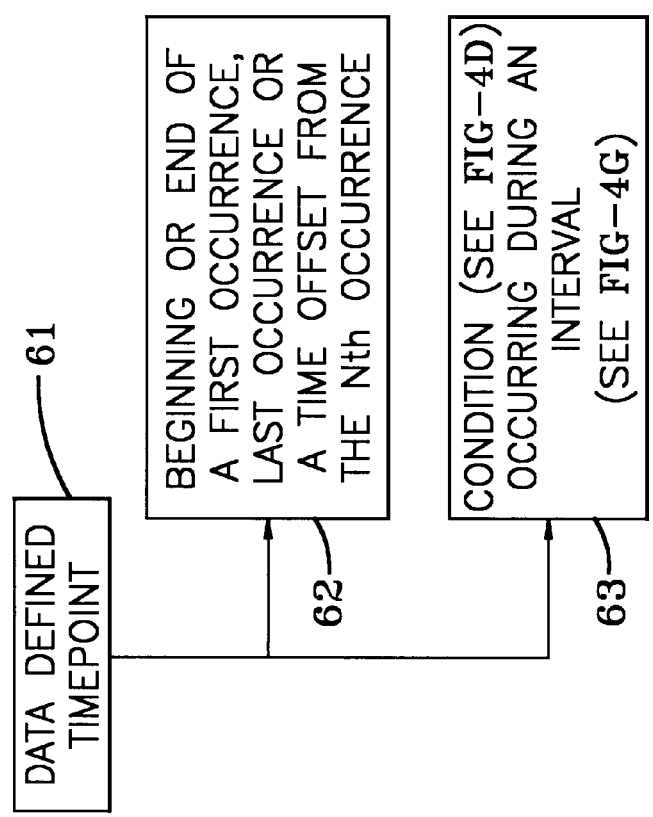
FIG. 4C is a flow diagram for defining a data timepoint.

Turning back to FIG. 4A, if a data defined timepoint is specified 47 the timepoint is defined by one or more values in the data, for example, when the flaps reach fifteen degrees, as shown in FIG. 4C.

Turning now to FIG. 4C, a flow diagram is shown for defining a data timepoint. The data defined timepoint 61 may be defined as the beginning or end of a first occurrence, last occurrence or time offset from an Nth occurrence of the data values for a parameter 62. Alternatively, the data defined timepoint may be defined as when a certain condition occurs (is true) within a selected time interval 63. The processing for determining when a condition is true is shown in FIG. 4D and the process for determining an interval is shown in FIG. 4G.

Turning now to FIG. 4D, a flow diagram is shown for determining when a condition is true. A condition is true 64 if the value of the parameter 65 (as determined in FIG. 4E) satisfies a comparison 66 (as determined in FIG. 4F) for the time range 67 defined relative to that time.

Turning now to FIG. 4E, a flow diagram is shown for defining a parameter. A parameter 77 may be a simple parameter 78 or an advanced parameter 79. A simple parameter can be defined as the value of or rate of change of a logical aircraft parameter 80 (as determined in FIG. 4L). An advanced parameter is a computed parameter and can depend on recorded aircraft parameters 81, the values of any previously defined measurements 82 (as shown in FIG. 4H), logical fleet constants 84 which are user defined constants per fleet (as shown in FIG. 4M), and modifiers 83 (as shown in FIG. 4K) are input to a formula 85 which calcualtes the value of the advanced parameter 86.

Turning now to FIG. 4G, a flow diagram for the definition of an interval 87 by a user is shown. The user selects a first and second previously defined timepoint 88 and then selects a duration of time 89 between the first and second previously defined timepoints (the previously defined timepoints are determined as shown in FIG. 4A).

Turning now to FIG. 4F, a flow diagram is shown for determining a comparison. The comparison 68 can be defined as the following: equal to 69, not equal to 70, less than 71, less than or equal to 72, greater than 73, greater than or equal to 74, between 75 or not between 76.

In FIG. 4H, a flow diagram for the definition of a measurement by a user is shown. The measurement definitions 90 may be the value of a parameter at a timepoint 91 (as determined in FIG. 4E) , an aggregate function over an interval 92 (as determined in FIG. 4I), computed using a formula that includes previously defined measurements 93 (as determined in FIG. 4J), a location in the data file of a particular timepoint 94 (where the timepoint is determined as shown in FIG. 4A) or the duration of an interval in the data file 95 (as determined in FIG. 4G).

Figure 4I:
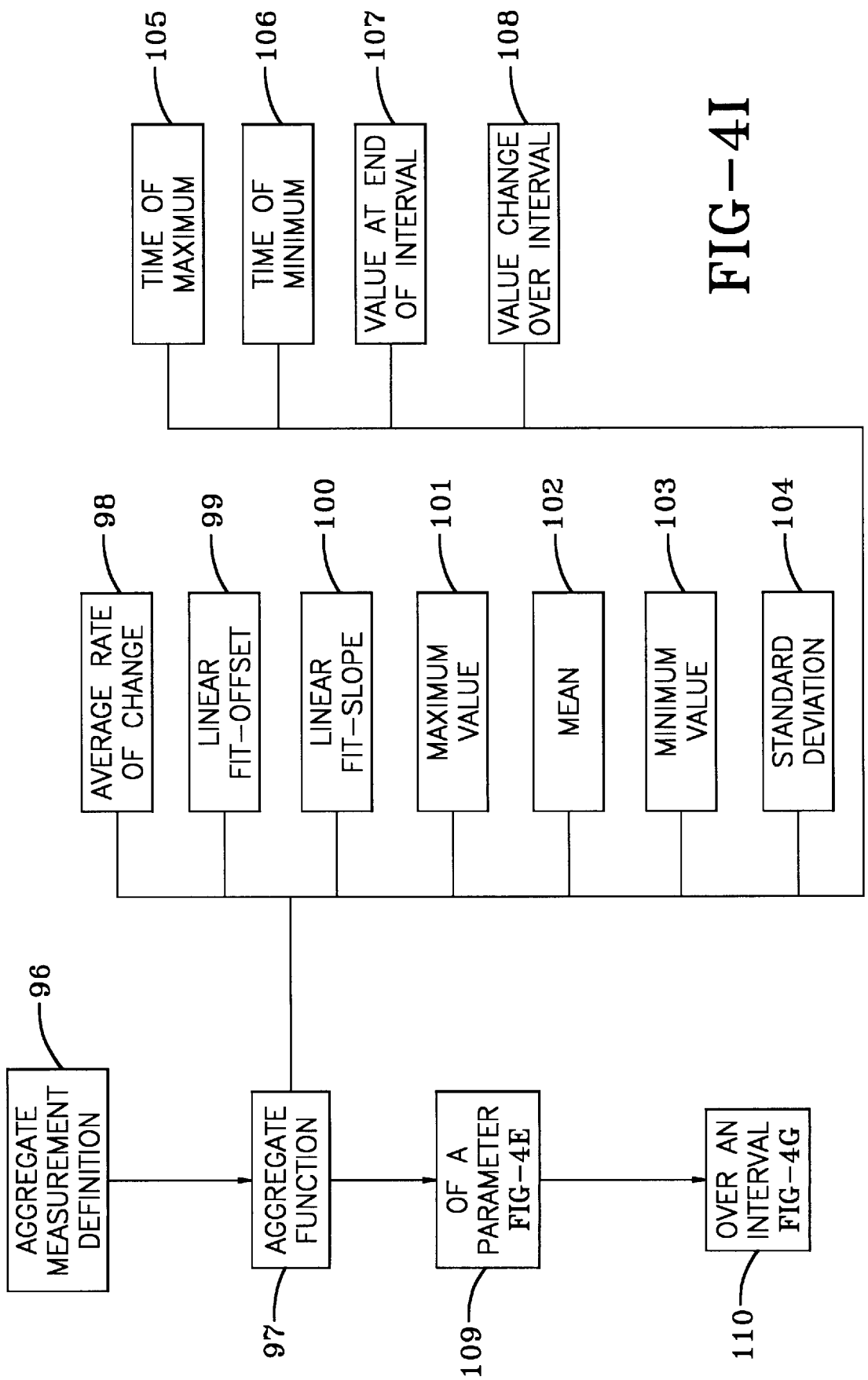
FIG. 4I is a flow diagram for the definition of an aggregate measurement.

Turning now to FIG. 4I, a flow diagram for the definition of an aggregate measurement 96 is shown. The aggregate function 97 can be defined as the average rate of change 98, linear fit-offset 99, linear fit-slope 100, maximum value 101, mean 102, minimum value 103, standard deviation 104, time of maximum 105, time of minimum 106, value at the end of an interval 107 or value change over an interval 108 of a parameter 109 (as determined in FIG. 4E) over and interval 110 (as determined in FIG. 4G).

Turning now to FIG. 4J, a flow diagram for the definition of a computed measurement is shown. The values of any previously defined measurement (as determined in FIG. 4H) 111, modifiers 112 (as determined in FIG. 4K), and fleet constants 113 which are user-defined constants per fleet are input to a formula 114 which computes the value of the computed measurement 115.

Turning now to FIG. 4K, a flow diagram for defining modifiers is shown. A modifier 124 can be arithmetic 116, algebraic 117, geometric 118, trigonometric 119, calculus 120, data filters 121, sampling rate 122 and logic 123.

Figure 4L:
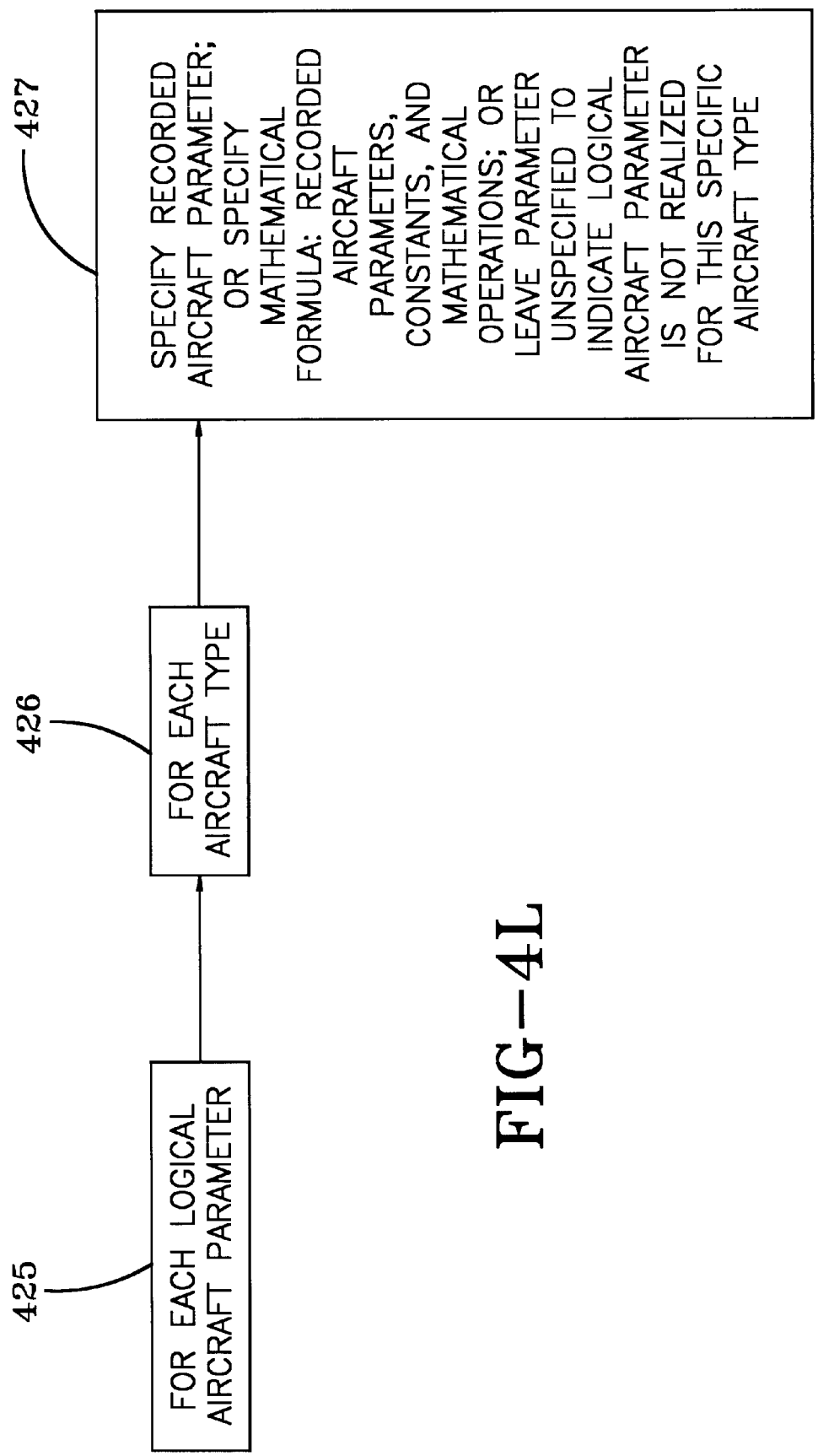
FIG. 4L is a flow diagram for defining a logical aircraft parameter.
Figure 4M:
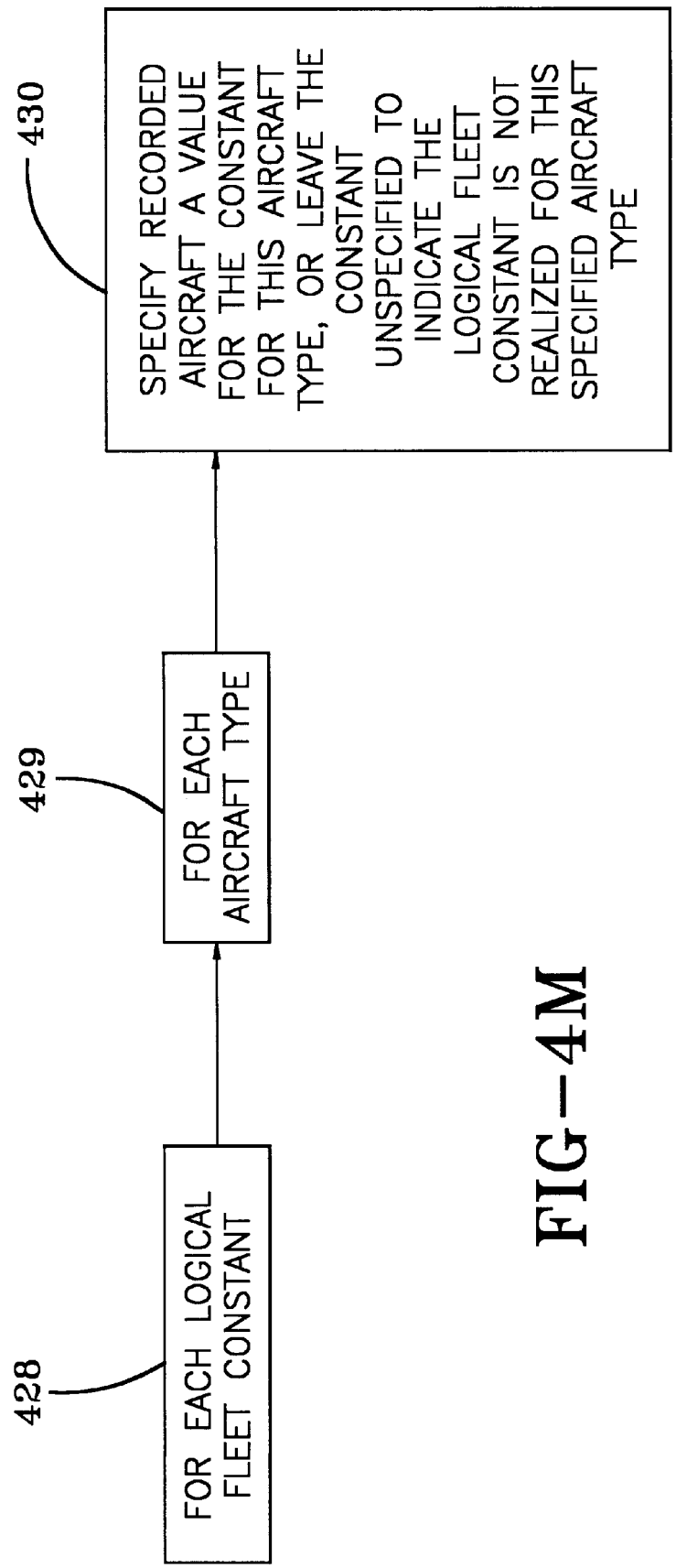
FIG. 4M is a flow diagram for defining a logical fleet constant.

Turning now to FIG. 4L, a flow diagram for defining a logical aircraft parameter is shown. For each logical aircraft parameter 425 for each aircraft type 426, either a recorded aircraft parameter is specified or a mathematical formula is specified, or the parameter is left unspecified to indicate that the logical aircraft parameter is not realized for this specific aircraft type 427.

Turning now to FIG. 4M, a flow diagram for defining a logical fleet constant is shown. For each logical fleet constant 428 for each aircraft type 429, either a value of the constant for this aircraft type is specified or the constant is left unspecified to indicate that the logical fleet constant is not realized for this specific aircraft type 430.

Turning now to FIG. 4N, a flow diagram for the definition of an event is shown. If the event definition 431 is a Boolean valued computed measurement 432, processing continues as shown in FIG. 4J. If the event is a data defined timepoint 433, processing continues 4 as shown in FIG. 4C.

FIG. 5 is a flow diagram showing the analysis engine processing. As shown in FIG. 5, in the analysis engine 125, each measurement definition determined by the user (shown in FIG. 4) and stored in the measurement definition file (43 in FIG. 4) 126 is used to process a single measurement 127 (processing is shown in FIG. 6) and output a measurement value 128.

Figure 6A:
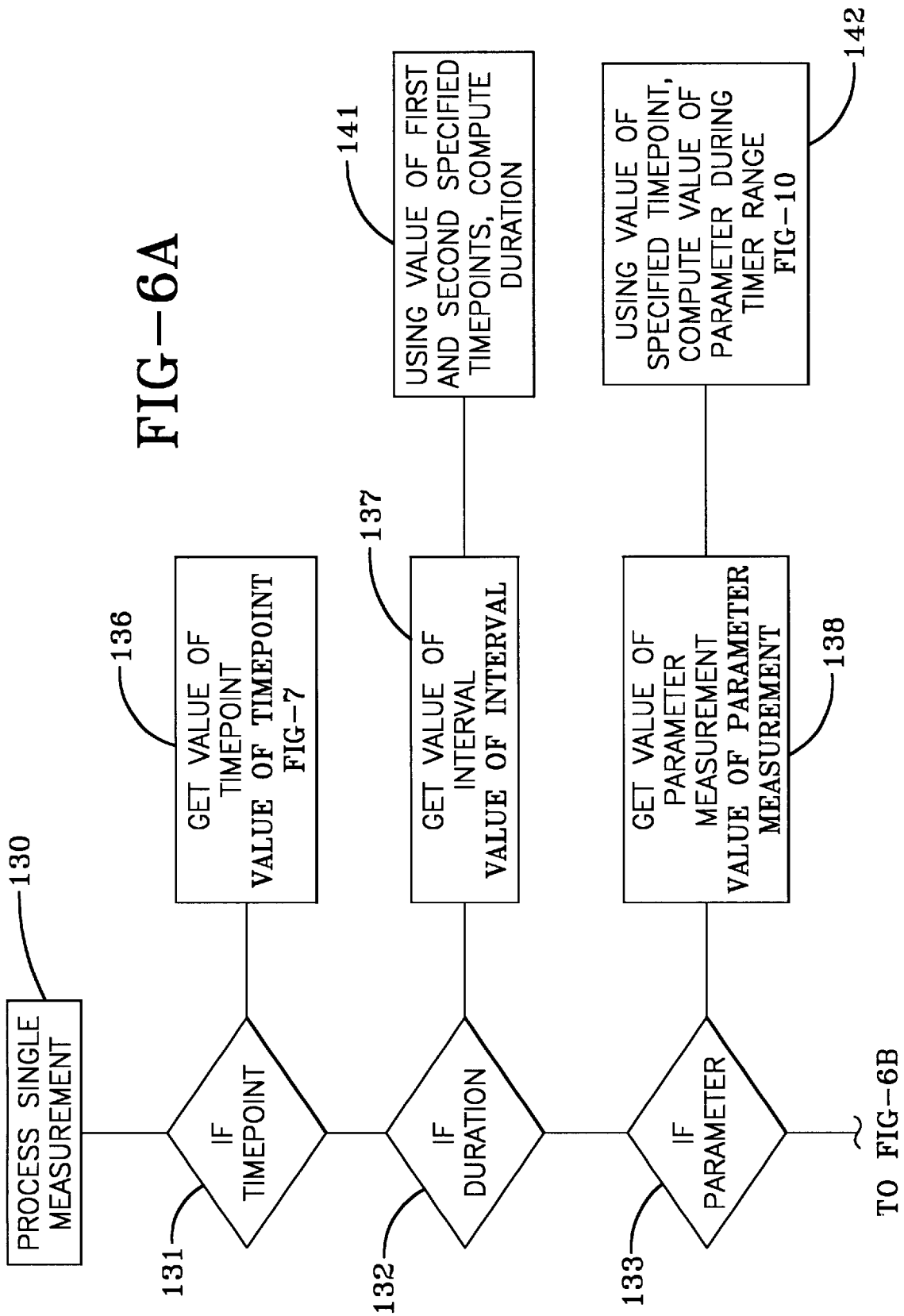
FIG. 6 is a flow diagram showing the processing of a single measurement in the analysis engine of FIG. 5.
Figure 7A:
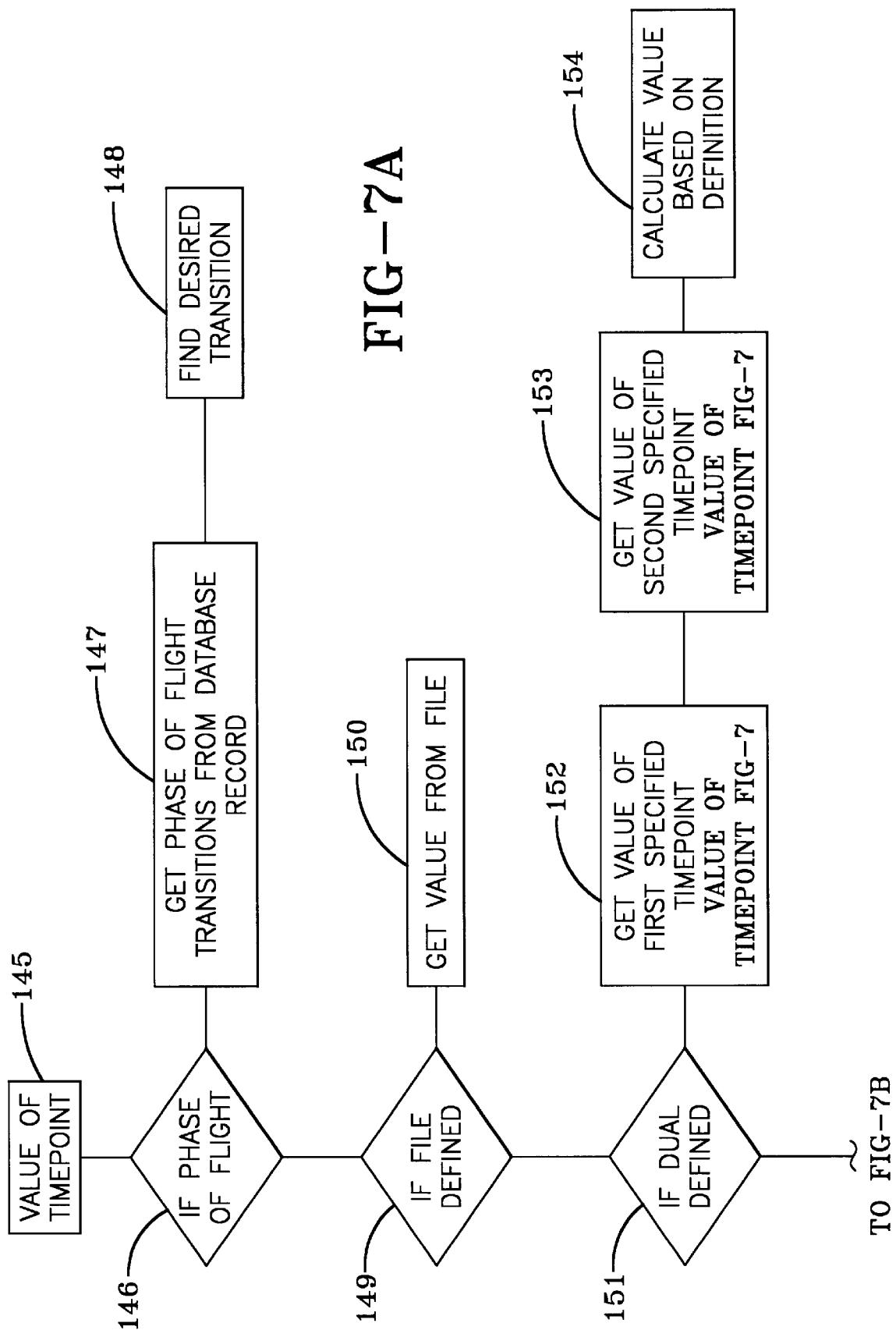
FIG. 7 is a flow diagram for determining the value of a timepoint.
Figure 7B:
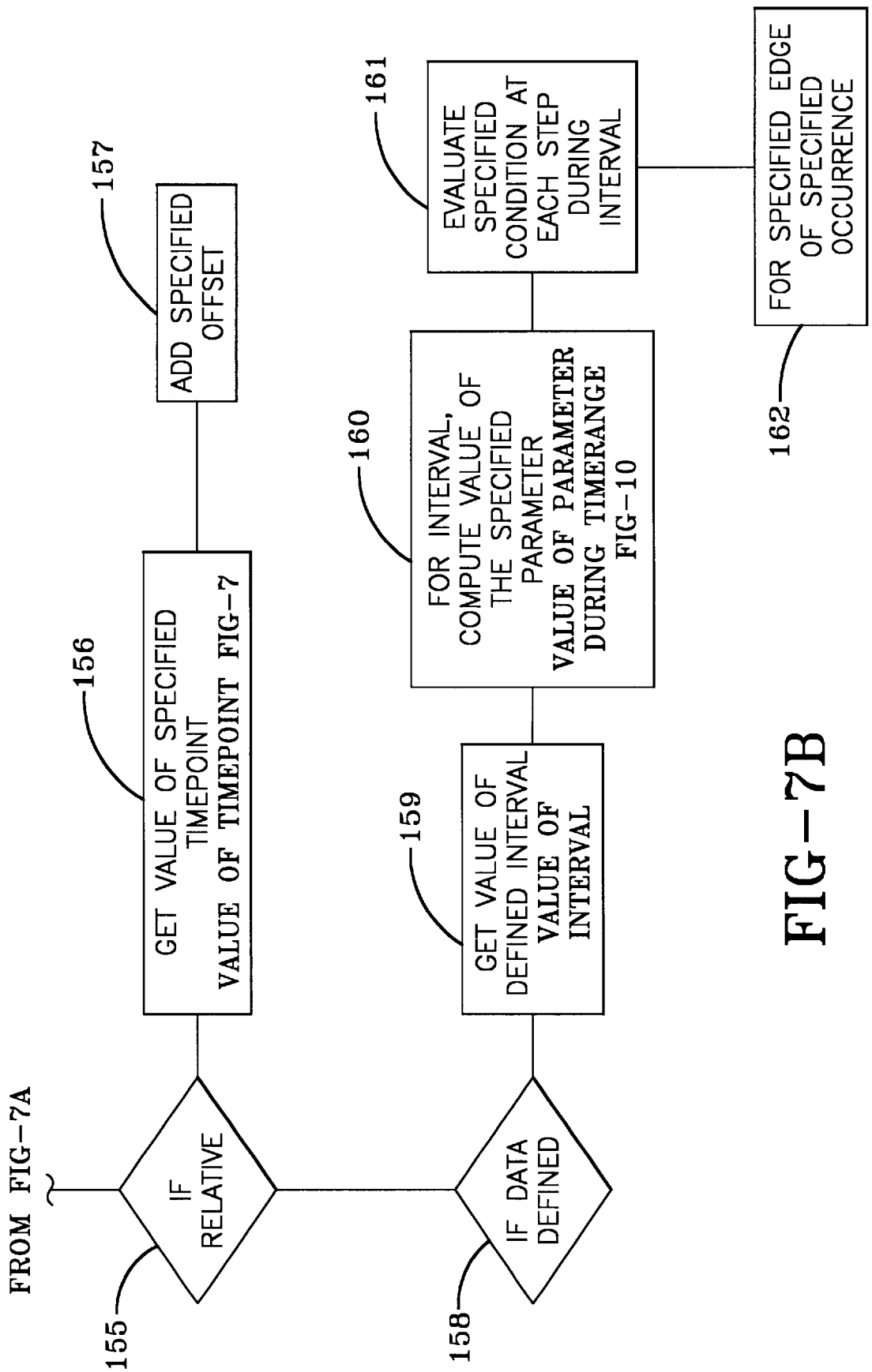
Figure 8:
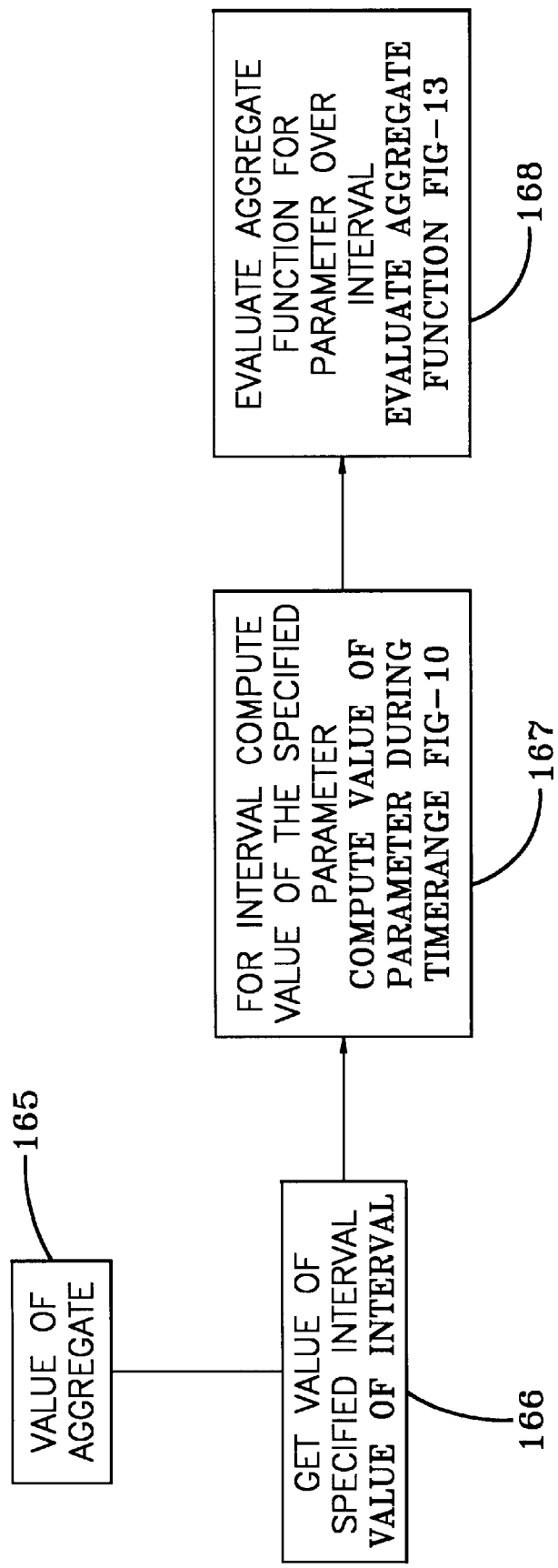
FIG. 8 is a flow diagram for determining the value of an aggregate measurement.

FIG. 6 is a flow diagram showing the processing of a single measurement 130 in the analysis engine of FIG. 5. If the measurement is a timepoint 131, the value of the timepoint is determined 136 as shown in FIG. 7. If the measurement is a duration 132, the value of the interval is determined 137 by using the value of the first and second specified timepoint and the duration is computed 141. If the measurement is a parameter 133, the value of the parameter is computed 138 at that timepoint. Using the value of the specified timepoint, the value of the parameter is computed during the timerange 142 (as shown in FIG. 10). If the measurement is an aggregate 134, the value of the aggregate is determined 139 (as shown in FIG. 8) over a specified time range. If the measurement is one that is to be computed 135, a formulaic computation (as shown in FIG. 9) is done to determined the computed value 140.

FIG. 7 is a flow diagram for determining the value of a timepoint 145. If the timepoint is for a phase of flight 146, the phase of flight transitions are obtained for a database record 147 and the desired transition is found 148. If the timepoint is file-defined 149, the value is obtained from the file 150. If the timepoint is dual-defined 151, the value of the first 152 and second timepoints 153 are determined and the value of the dual-defined timepoint is calculated 154. If the timepoint is one that is relative to another previously specified timepoint 155, the value of the other specified timepoint is obtained 156 and the specified relative offset value is added to it to determine the relative timepoint 157. If the timepoint is data defined 158, the value of the defined interval is determined (as shown in FIG. 6, 137 and 141) and the value of the specified parameter is computed 160 (as shown in FIG. 10). The specified condition at each step during the interval is evaluated 161 for the specified edge of the specified occurrence 162.

Figure 13A:
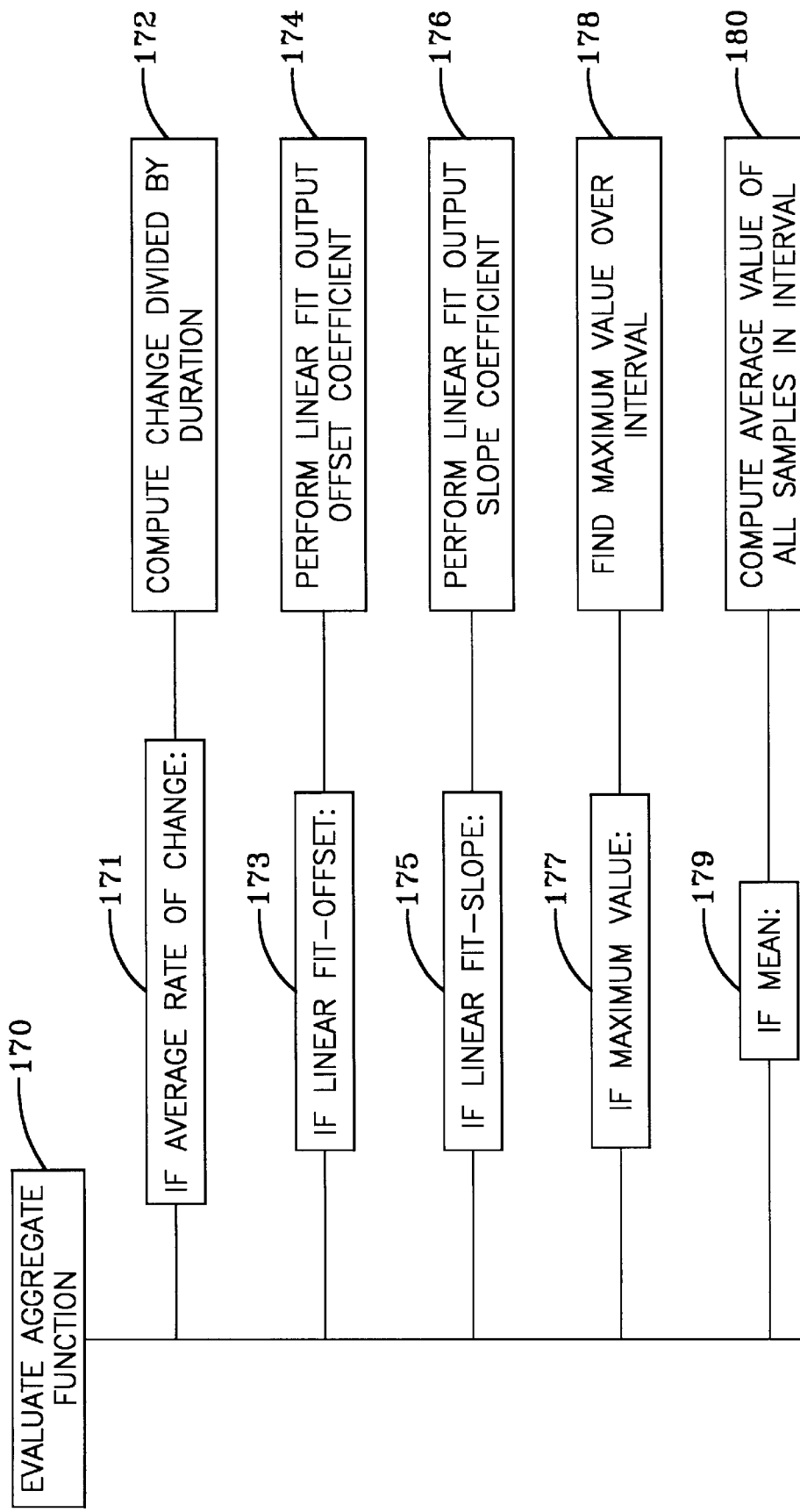
FIG. 13 is a flow diagram showing the evaluation of the aggregate function.
Figure 13B:
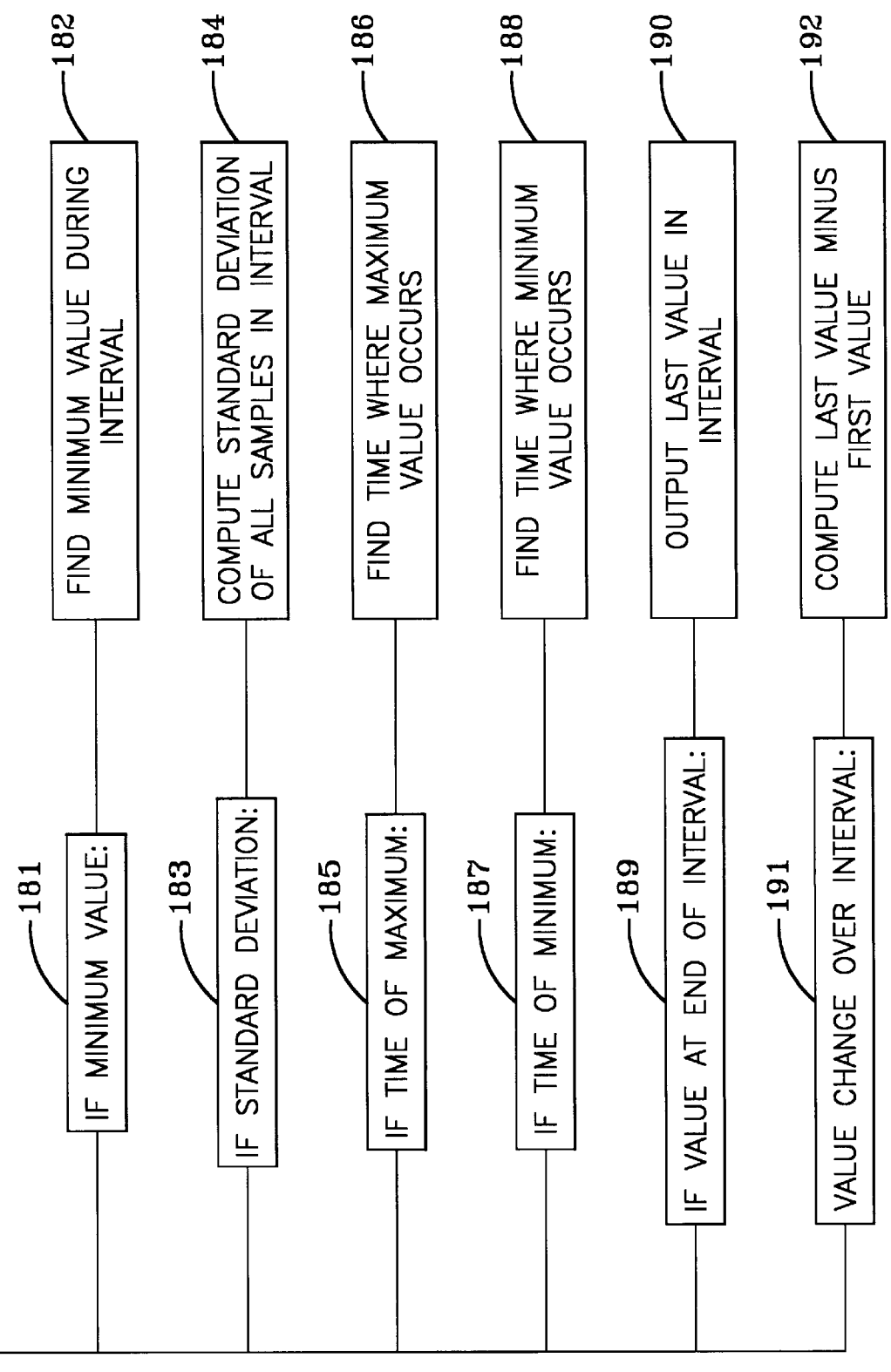

FIG. 8 is a flow diagram for determining the value of an aggregate measurement 165. The value of the interval is determined 166 (as shown in FIG. 6, 137 and 141). For the interval, the value of the parameter during the timerange is calculated 167 as shown in FIG. 10. The aggregate function is then evaluated 168 as shown in FIG. 13.

Figure 9:
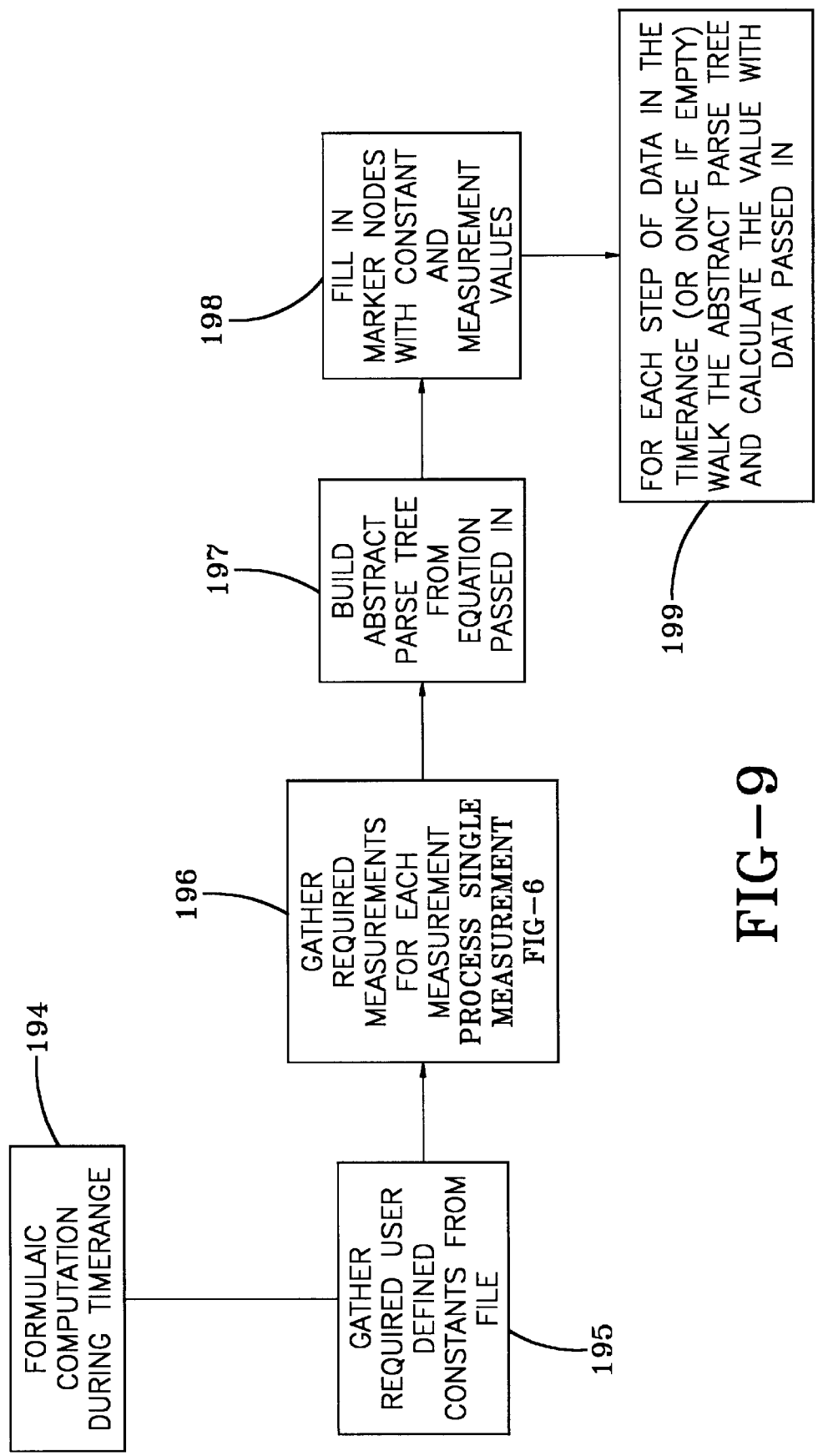
FIG. 9 is a flow diagram for determining the formulaic computation processing during the specified timerange and determining the value of a computed measurement.
Figure 10:
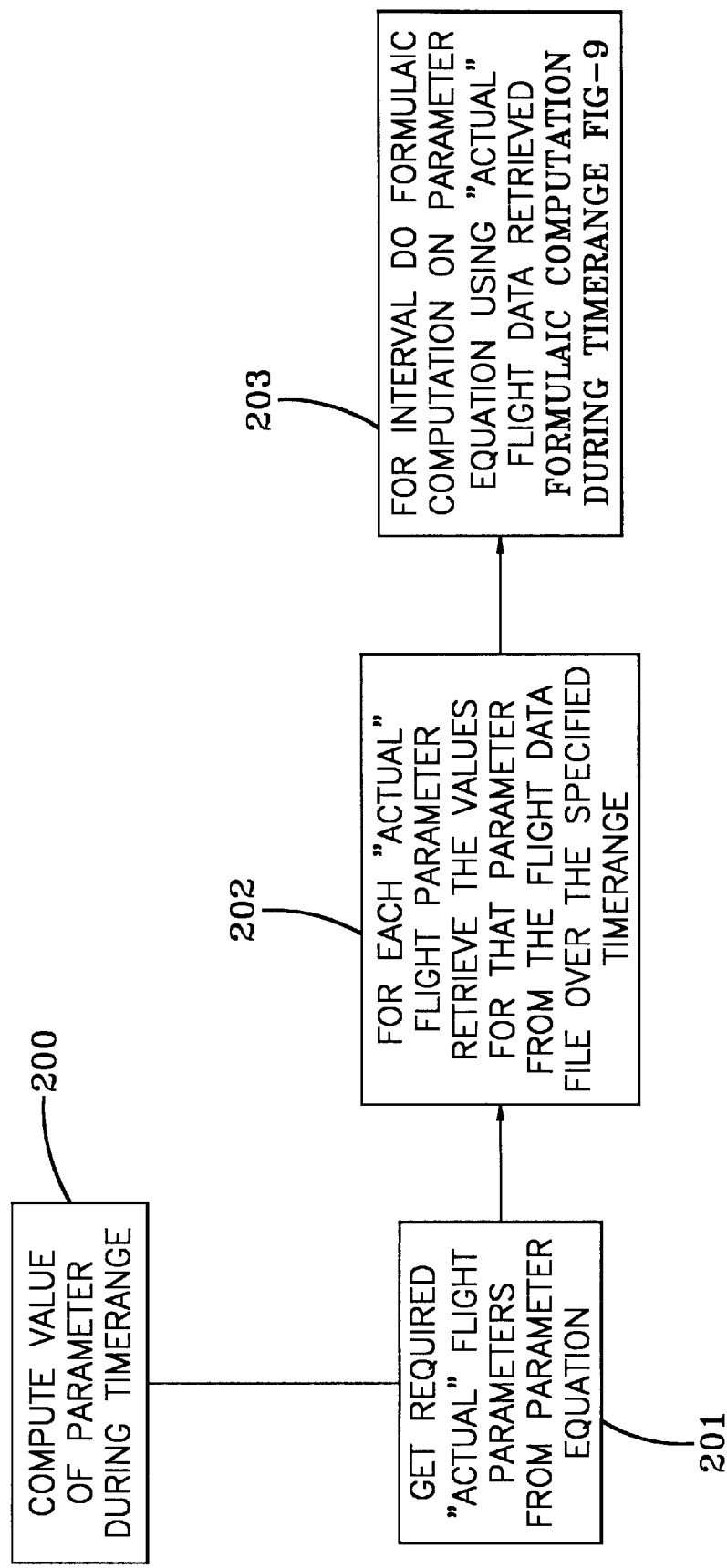
FIG. 10 is a flow diagram for computing the value of a parameter during the specified timerange.

FIG. 9 is a flow diagram for determining the formulaic computation processing during the specified timerange 194 and determining the value of a computed measurement. The user defined constants are gathered 195 and the measurements to compute the values are determined 196 as shown in FIG. 6. An abstract parse tree is built from an equation 197 and marker nodes are filled with the constant and measurement values 198. For each step of the data in the timerange, the abstract parse tree is walked and the values are calculated 199.

FIG. 10 is a flow diagram for computing the value of a parameter during the specified timerange 200. The required actual flight parameters from a parameter equation are obtained 201. For each actual flight parameter, the values for that parameter are retrieved from the flight data file over the specified time range 202. For the interval, a formulaic computation is performed on a parameter equation using actual flight data retrieved 203 as shown in FIG. 9.

Figure 11:
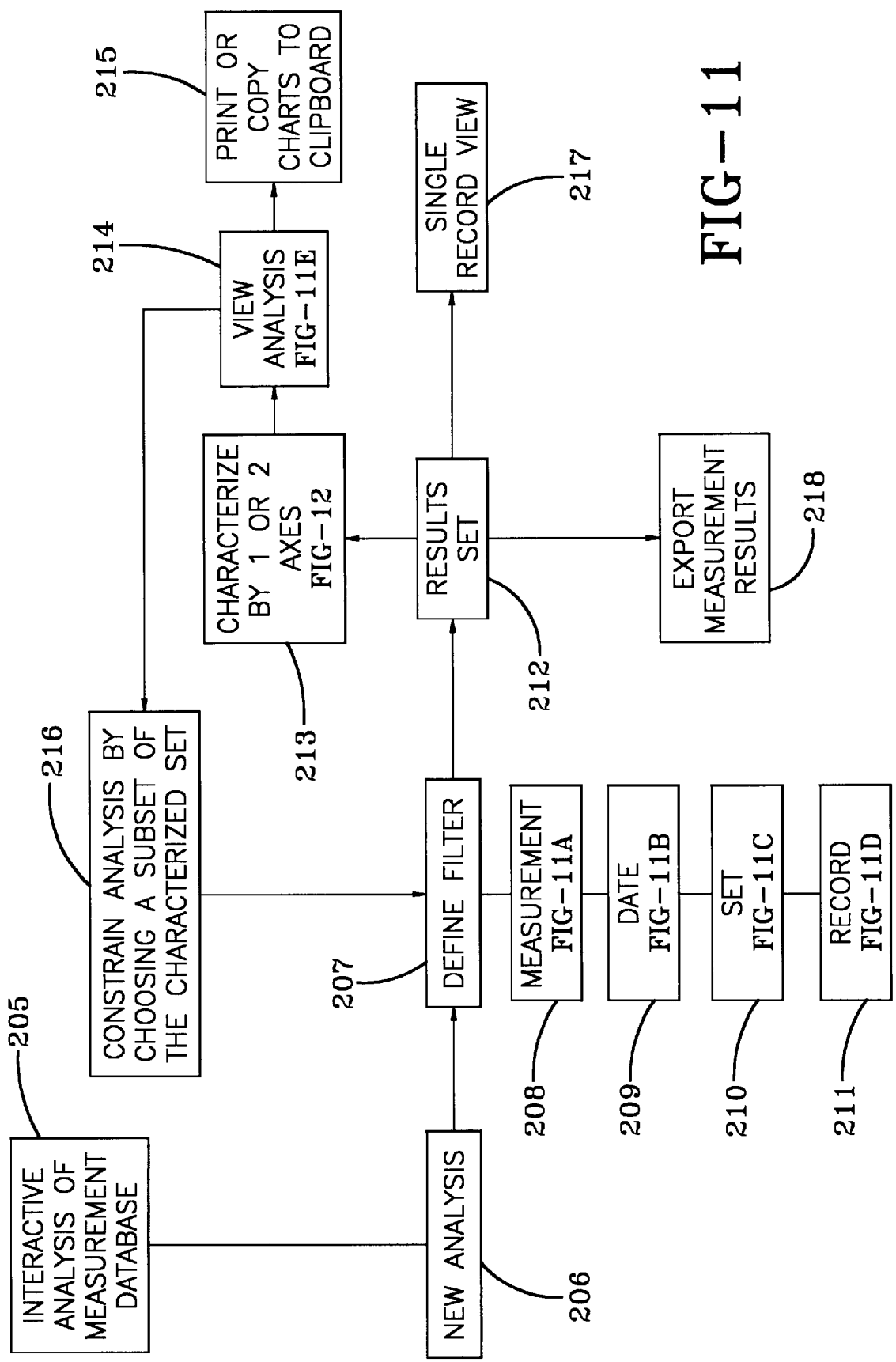
FIG. 11 is a block diagram of performing interactive analysis of the measurement database using the data in the flight data analysis database.

FIG. 11 is a block diagram of performing interactive analysis of the measurement database 205 using the data in the flight data analysis database (16 and 18 of FIG. 1). If the analysis to be performed is a new analysis 206 (not been previously performed and does not currently exist), a new filter for the measurement data must be defined 207. Filters can be defined as a combination of measurement 208 (shown in FIG. 11A), date 209 (shown in FIG. 11B), set 210 (shown in FIG. 11C) or record number 211 (shown in FIG. 11D) filters.

Figure 11A:
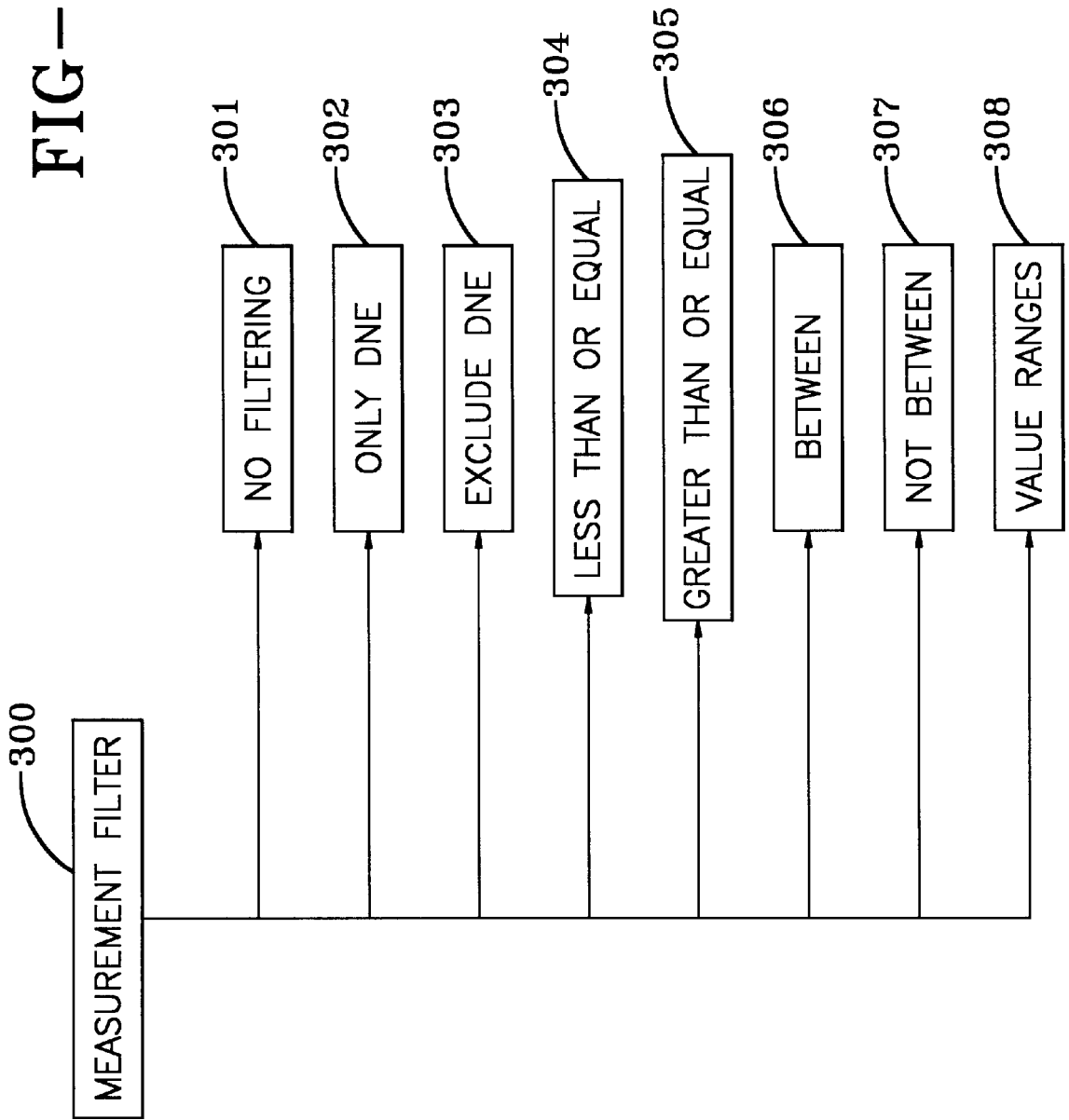
FIG. 11A is a diagram of the types of measurement filters.

Turning now to FIG. 11A, for a measurement filter 300, the type can be selected from the following: no filtering 301, only does not equal 302, excluding does not equal 303, less than or equal 304, greater than or equal 305, between 306, not between 307 or a range of values 308.

Figure 11B:
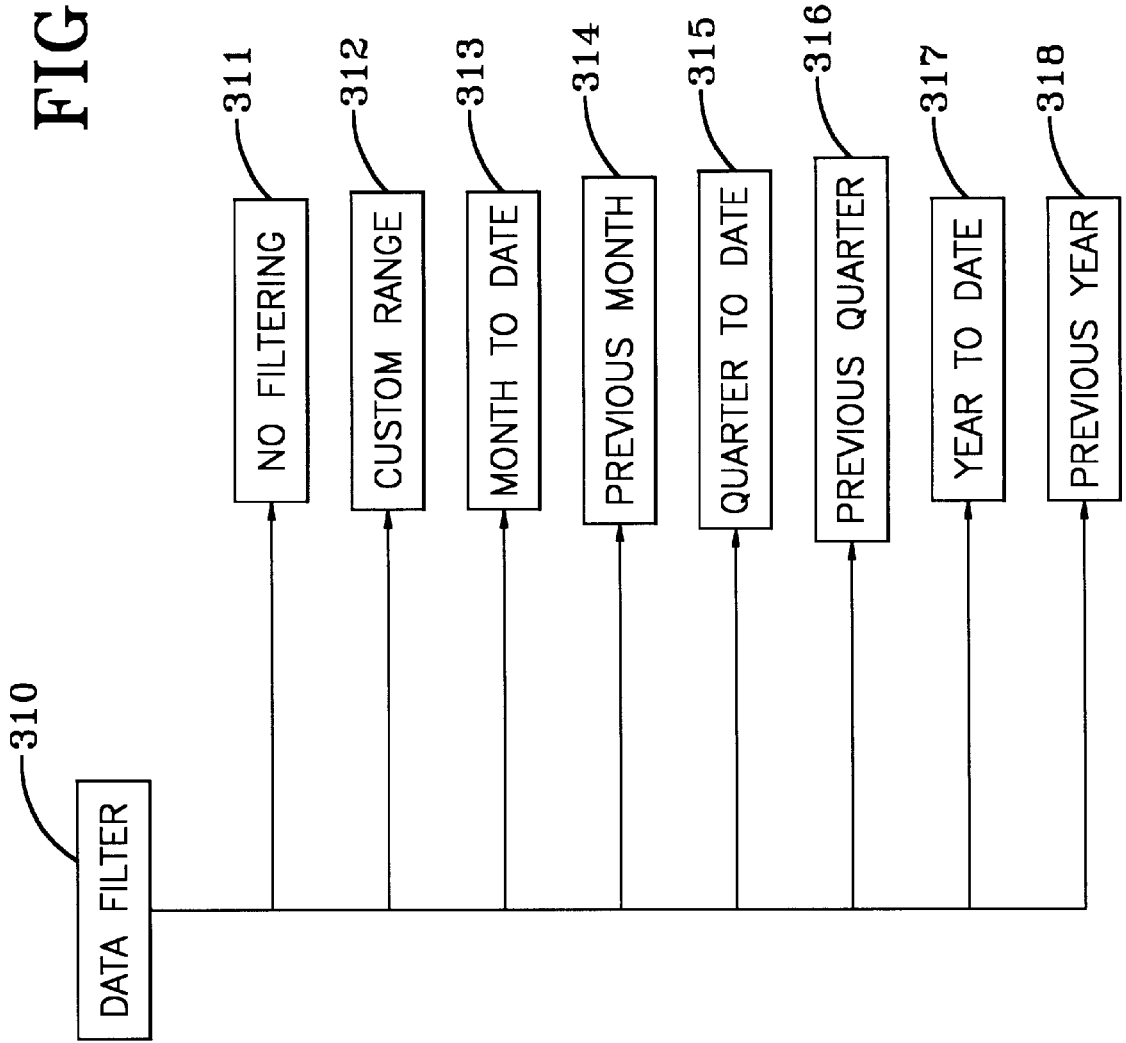
FIG. 11B is a diagram of the types of date filters.

Turning now to FIG. 11B, for a date filter 310, the type can be selected from: no filtering 311, custom range 312, month to date 313, previous month 314, quarter to date 315, previous quarter 316, year to date 317 or previous year 318.

Figure 11D:
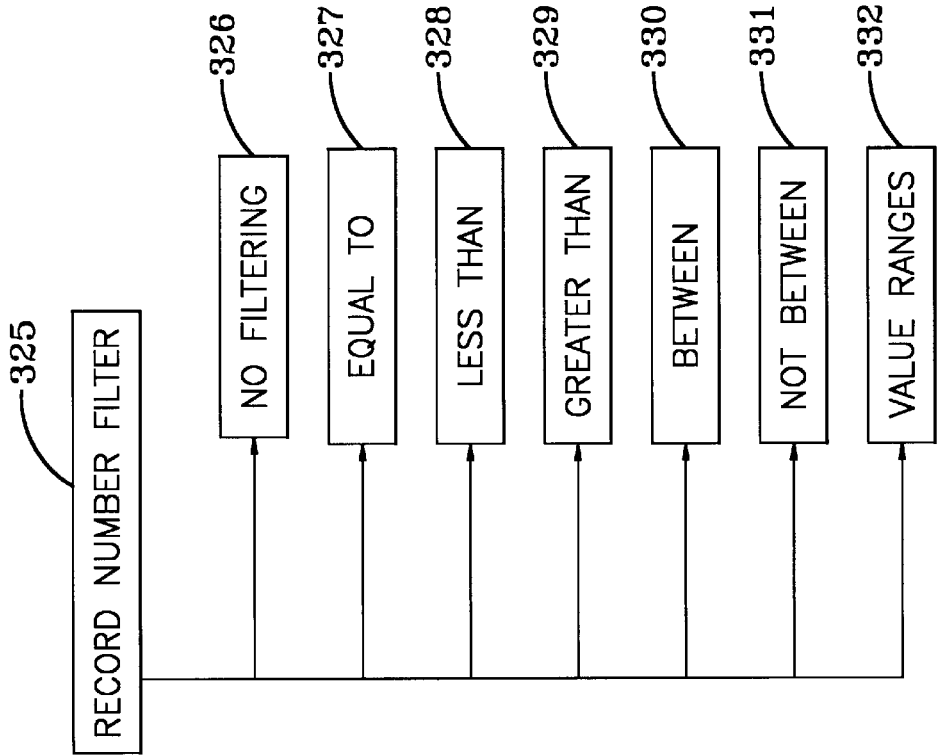
FIG. 11D is a diagram of the types of record number filters.
Figure 11C:
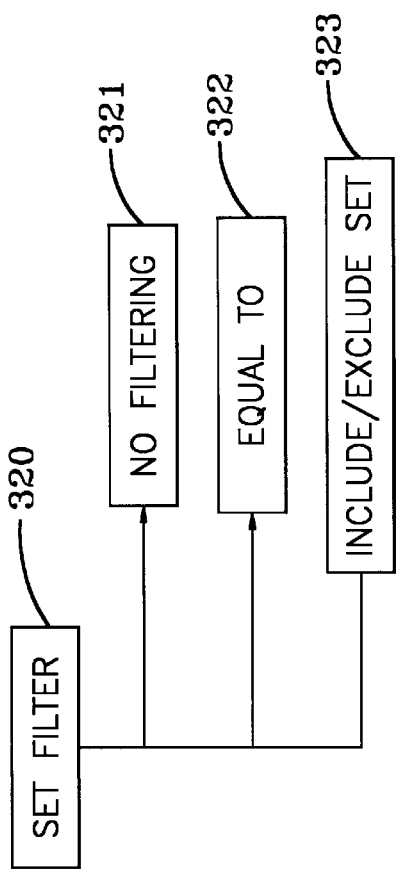
FIG. 11C is a diagram of the types of set filters.

Turning now to FIG. 11C, for a set filter 320, the type can be selected from the following: no filtering 321, equal to or including 322 or including/excluding a particular set 323. If the filter is to include or exclude a particular set, the user can edit the filter to include or exclude all items in the set or just selected items in the set.

Turning now to FIG. 11D, for a record number filter 325, the type can be selected from: no filtering 326, equal to 327, less than 328, greater than 329, between 330, not between 331 or a range of values 332.

Figure 12:
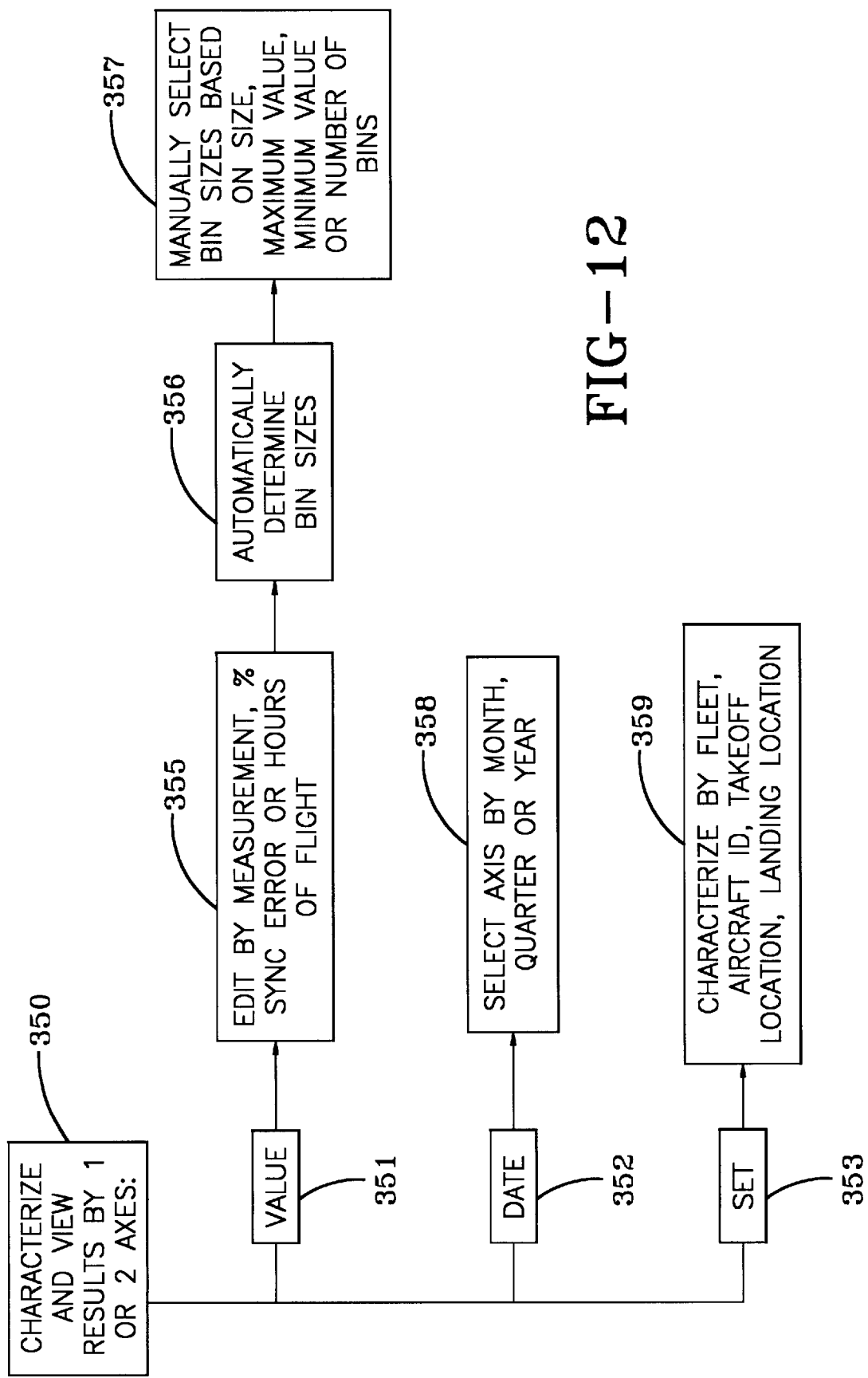
FIG. 12 is a diagram of characterizing and viewing the results data.

Turning back to FIG. 11, once the filter is defined and run on the flight data 207, a set of results is generated 212. Depending upon the filter chosen and the amount of data in the flight data file, the set of results may include no data or a large amount of data. The user can then select the way to characterize and view the data 213 as shown in FIG. 12. Turning now to FIG. 12, block diagram of characterizing and viewing the results data is shown 350. The data can be characterized by its value 351, date 352, or by the set to which it belongs 353. If the data is to be characterized by its value 351 (which could include a measurement, percentage error or hours of flight 355) the program can automatically determine the bin (or data) sizes 356, or can allow the user to manually select bin sizes according to the size of the bin, the minimum or maximum value of the bin or number of bins 357. If the data is to be characterized by its date 352, the user can further select the particular month, quarter or year of interest 358. If the data is to be characterized by set 353, the user can select from the sets comprising a fleet, aircraft identification number, takeoff location or landing location 359.

Figure 11E:
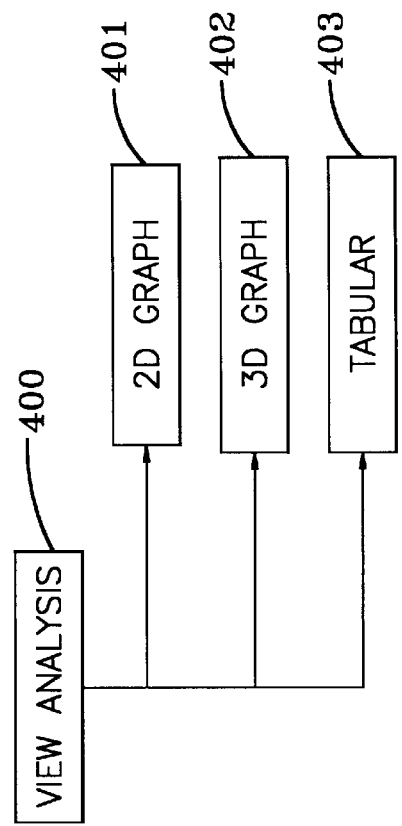
FIG. 11E is a diagram of the view analysis processing.

Turning back to FIG. 11, once the data has been characterized 213, the user may now view the analysis 214. The view of the analysis processing is shown in FIG. 11E. Turning now to FIG. 11E, the view analysis 400 can be represented and viewed by means of a two dimensional (2D) graph 401, a three dimensional graph (3D) 402 or may be viewed in tabular format 403. If a 2D graph view is chosen 401, it may be a bar graph, pie graph, line graph, stack graph, inverse axis orientation, or made to appear as a 3D graph. If a 3D graph view is chosen 402, it may be a smooth contour graph, 2D projection, smooth 2D projection, bar graph, zoned bar graph or contour graph. If a tabular view is chosen 403, the user can choose to filter, sort and display totals and generally modify the data set.

Turning back to FIG. 11, after the user has viewed the analysis 214, the user may print or save the analysis view 216. The user may also choose to further constrain the analysis 215. This is performed using an iterative process, so processing goes back to defining a new filter 207 and running that new filter on the previously generated set of data to generate a set of results that further constrain and characterize the data set 212. This constraining process 216 can continue to be repeated.

After generating the set of results 212, the user can chose to view a single record 217 which allows the user to view the timepoint, measurements for a single flight. After generating the set of results 212, the user can also choose to export the set of measurement results 218. The user can generate a report or spreadsheet of measurements and/or record fields comprising the entire set of results data generated or can choose to export only the current analysis that is being displayed to the user as generated in the single record view (217 in FIG. 11) or in the view analysis of multiple records (214 in FIG. 11).

FIG. 13 is a flow diagram showing the evaluation of the aggregate function 170. If the average rate of change function is to be determined 171, then the change is computed divided by the duration 172. If linear fit offset function is to be determined 173, a linear fit is performed and the output offset coefficient is computed 174. If linear fit slope function is to be determined 175, a linear fit and slope coefficient is computed 176. If maximum value function is to be determined 177, the maximum value over the interval is computed 178. If the mean is to be determined 179, the value of all samples in the interval is computed 180. If the minimum value function is to be determined 181, the minimum value during the interval is found 182. If a standard deviation function is to be determined 183, the standard deviation of all samples in the interval is computed 184. If a time of maximum function is to be determined 185, the time where the maximum value occurs is found 186. If a time of minimum function is to be determined 187, the time where the minimum value occurs is found 188. If a value at the end of an interval function is to be determined 189, the last value in the interval is output 190. If the value change over the interval function is to be determined 191, the last value minus the first value is computed 192.

Figure 14:
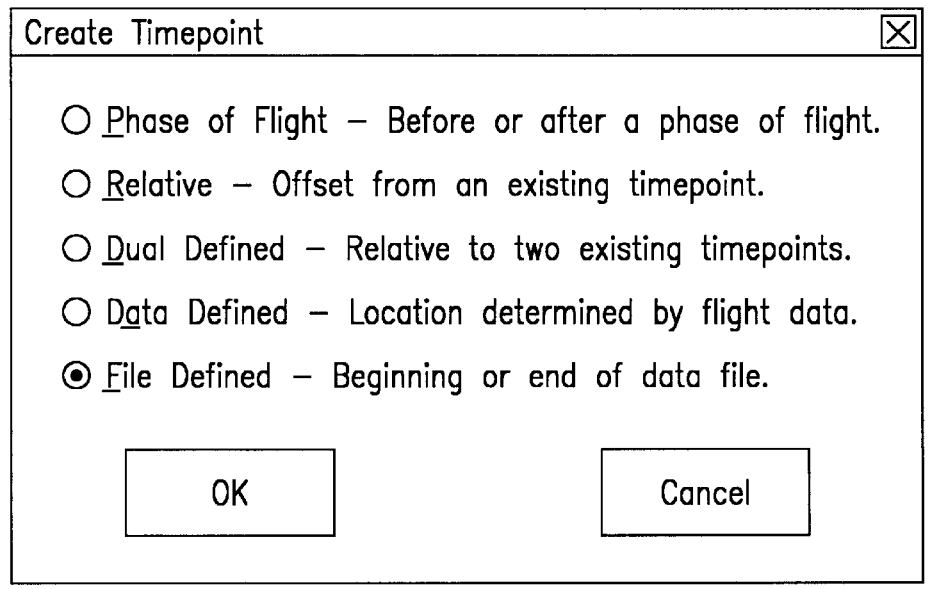
FIG. 14 shows the graphical user interface for creating a timepoint (FIG. 4A).

FIG. 14 shows the graphical user interface for creating a timepoint (FIG. 4A).

Figure 15:
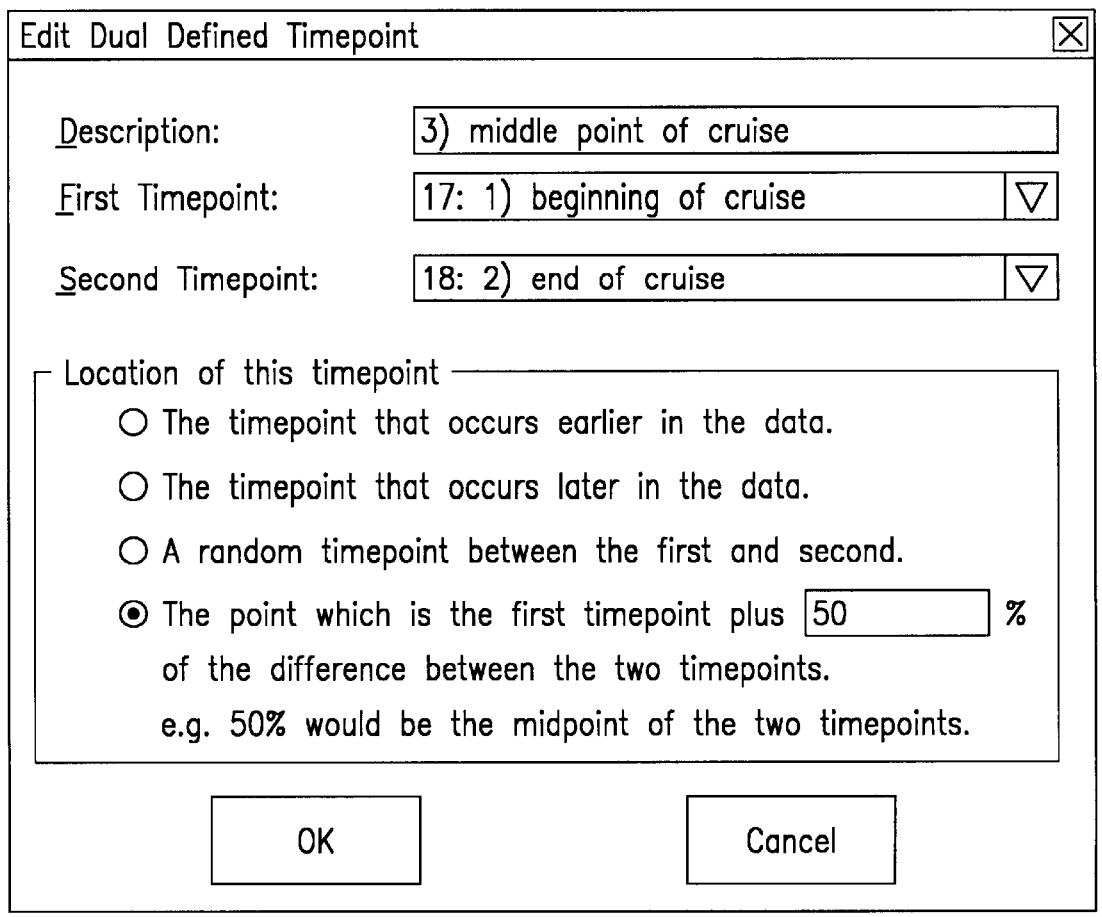
FIG. 15 shows the graphical user interface for creating a dual defined timepoint (FIG. 4B).

FIG. 15 shows the graphical user interface for creating a dual defined timepoint (FIG. 4B).

FIG. 16 shows the graphical user interface for determining a data defined timepoint (FIG. 4C)

FIG. 17 shows the graphical user interface for determining an advanced parameter (FIG. 4E).

Figure 18:
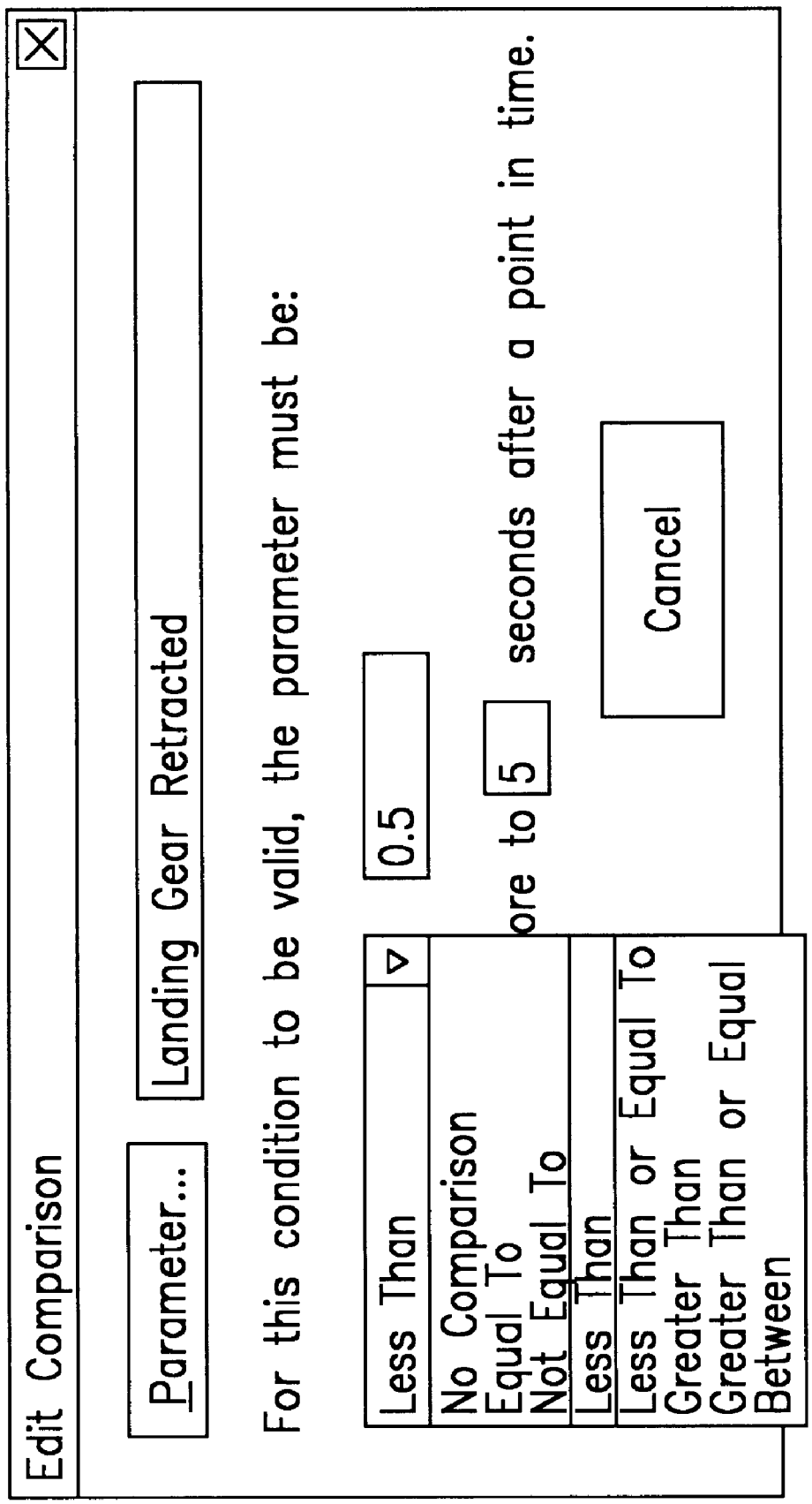
FIG. 18 shows the graphical user interface for determining a comparison (FIG. 4F).

FIG. 18 shows the graphical user interface for determining a comparison (FIG. 4F).

What is claimed is:

1. A computer program for post-flight data analysis of aircraft flight data comprising the steps of:
   a. using recorded flight data containing data for one or more flights of interest;
   b. for one or more flights of interest, analyzing the recorded flight data using user defined measurement definitions, said measurement definitions defined by a user prior to analyzing the flight of interest; and
   c. saving the results of the analysis for each flight of interest.

2. A computer program according to claim 1, further comprising:
   a. repeating steps a and b for different sets of user defined measurements; and
   b. saving each result in a flight analysis data base.

3. A computer program according to claim 1, wherein the user defined measurements are stored in a measurement definition file.

4. A computer program according to claim 1, wherein the recorded flight data is preprocessed and stored in a flight database.

5. A computer program according to claim 4, wherein the preprocessing comprises:
   a. segmenting the data into individual flights;
   b. identifying the phases of flight;
   c. deidentifying the individual flights; and
   d. determining airport locations for take off and landing.

6. A computer program according to claim 5, further comprising storing the results of steps a through d in a flight database.

7. A computer program according to claim 1, wherein the user defined measurements are selected from the group consisting of timepoint definitions, interval definitions measurement definitions, and event definitions.

8. A computer program according to claim 1, wherein the user defined measurements comprise:
   a. timepoint definitions;
   b. interval definitions;
   c. measurement definitions; and
   d. event definitions.

9. A computer program according to claim 8 wherein the timepoint definitions are selected from the group consisting of phase of flight timepoint, relative timepoint; dual defined timepoint, data defined timepoint and file defined timepoint.

10. A computer program according to claim 8, wherein the timepoint definitions comprise defining a timepoint relative to a phase of flight specified by the user.

11. A computer program according to claim 8, wherein the timepoint definitions comprise a timepoint to be defined relative to a single selected timepoint.

12. A computer program according to claim 8, wherein the timepoint definitions comprise:
   a. a timepoint to be defined relative to a first and second specified timepoints;
   and
   b. the timepoint to be defined may be selected from the group consisting of: a timepoint at an earlier time than the first and second selected timepoints, a timepoint at a later time than the first and second selected timepoints, a timepoint at a randomly occurring time at a time between the first and second selected timepoints, and a timepoint at a specified interval between the first and second selected timepoints.

13. A computer program according to claim 8, wherein the timepoint definitions comprise a data defined timepoint.

14. A computer program according to claim 8, wherein the timepoint definitions comprise a timepoint to be defined relative to a selected condition that occurs during a specified interval of time.

15. A computer program according to claim 14, wherein the selected condition occurs when a value of a parameter satisfies a comparison during a time range specified by the user.

16. A computer program according to claim 15, wherein the parameter comprises a simple parameter that is a value of a logical aircraft parameter for a specified aircraft type.

17. A computer program according to claim 15, wherein the parameter comprises a simple parameter that is a rate of change of a logical aircraft parameter for a specified aircraft type.

18. A computer program according to claim 15, wherein the parameter is an advanced parameter comprising a calculated value.

19. A computer program according to claim 18, wherein the calculated value comprises inputting recorded aircraft data, user defined measurement definitions, modifiers and logical fleet constants into a formula to generate the advanced parameter.

20. A computer program according to claim 8, wherein the user defined measurement definitions comprise a value of a parameter at a timepoint.

21. A computer program according to claim 8, wherein the user defined measurements comprise an aggregate function over an interval.

22. A computer program according to claim 8, wherein the user defined measurements comprise a computed measurement.

23. A computer program according to claim 22, wherein the computed measurement comprises inputting previously defined measurements, modifiers and logical fleet constants into a formula to generate the computed measurement.

24. A computer program according to claim 8, wherein the user defined measurements comprise a location in the data of a particular timepoint.

25. A computer program according to claim 8, wherein the user defined measurements comprise a duration of an interval in the recorded flight data.

26. A computer program according to claim 8, wherein the timepoint definitions comprise a time point selected from the group consisting of the start or end of the flight of interest in the data base of flight data measurements.

27. A computer program according to claim 8, wherein the interval definitions comprise selecting an interval of time between first and second previously defined timepoints.

28. A computer program according to claim 8, wherein the measurement definitions comprise:
  a. parameter measurements;
  b. aggregate measurements;
  c. computed measurements;
  d. timepoint measurements; and
  e. duration measurements.

29. A computer program according to claim 28, wherein the parameter measurement comprises the value of a parameter at a specified timepoint.

30. A computer program according to claim 28, wherein the parameter measurement comprises the value of an aggregate function over a specified interval.

31. A computer program according to claim 30 wherein the aggregate function is selected from the group consisting of average rate of change, linear fit-offset, linear fit-slope, maximum value, mean value, minimum value, standard deviation, time of maximum, time of minimum, value at an end of an interval, or value change over an interval.

32. A computer program according to claim 28, wherein the computed measurement is computed by building a formula using values of any previously defined measurement, aircraft logical fleet constants and a set of mathematical and logical modifiers.

33. A computer program according to claim 28, wherein the timepoint measurement is a timepoint within the flight analysis database.

34. A computer program according to claim 7, wherein the interval definition is a duration of time between a first and second timepoint.

35. A computer program according to claim 19, wherein the modifiers are selected from the group consisting of: arithmetic, algebraic, geometric, trigonometric, calculus, data filters, sampling rate and logical.

36. A computer program according to claim 1, wherein the analyzing step comprises processing each user defined measurement contained in a measurement file and outputting a measured value.

37. A computer program according to claim 1, wherein for a particular flight of interest, in the analyzing step, if the user measurement is a timepoint, the value of timepoint is saved for the flight of interest in a flight analysis data base.

38. A computer program according to claim 8, wherein the event definitions are selected from the group consisting of Boolean valued computed measurements and data defined timepoints.

39. A method for analyzing recorded aircraft flight data, in a computer program running on a computer processor, comprising:
  a. providing recorded flight data;
  b. analyzing the recorded flight data using user defined measurement definitions, said measurement definitions defined by a user prior to analyzing the flight of interest;
  c. collecting the results of steps a through c and storing the results in a flight analysis database; and
  d. displaying the results to the user.

40. A method according to claim 39, further comprising:
  a. analyzing the flight analysis database to detect if the results of step d include any out of bound conditions as defined by the user; and
  b. storing any out of bound conditions in an anomaly database.

41. A method according to claim 39 wherein the recorded fight data is processed and stored in a flight database.

42. A method according to claim 39 wherein the flight data is for one or more flights of a same aircraft.

43. A method according to claim 39 wherein the flight data is for one or more flights of different aircraft of a same aircraft type.

44. A method according to claim 39 wherein the flight data is for one or more flights of different aircraft of a different aircraft type.

45. A method according to claim 39 further comprising allowing the user to perform interactive analysis of the flight analysis database.

46. A method according to claim 44 wherein the interactive analysis comprises:
   a. using selected user defined measurement criteria, analyzing the data in the flight analysis database and generating a new set of results;
   b. storing the results in the flight analysis database;
   c. allowing the user to selectively view the results; and
   d. exporting the results in a user-defined format.

47. A method according to claim 45, wherein the user can view the results as a histogram.

48. A method according to claim 45, wherein the user can view the results in three dimensions.

49. A method according to claim 45, wherein the allowing the user to selectively view the results step comprises allowing the user to select data to be displayed by the value of the data, the date of the data and the set of the data.

50. A method according to claim 48, wherein the set of the data can be characterized by aircraft fleet, aircraft identification, aircraft takeoff location and aircraft landing location.

51. A method according to claim 48, wherein the value of the data comprises a selected measurement, percentage of error and hours of flight.

52. A method according to claim 45, wherein the user can view the results for a single flight.

53. A method according to claim 45, wherein exporting the results in a user-defined format comprises generating a report of the results selected from the group consisting of the entire set of results or a current view of the results displayed to the user.

54. A method according to claim 45, wherein exporting the results in a user-defined format comprises generating a spreadsheet of the results.

55. A method according to claim 45, wherein the user defined measurement criteria, comprises determining constraints to be applied to the flight database.

56. A method according to claim 54, wherein determining the constraints comprises selecting a filter from the group consisting of a measurement filter, a date filter, a set filter, and a record number filter.

57. A method according to claim 55, wherein the measurement filter is selected from the group consisting of no filter, measurement does not exist filter, exclude a measurement that does exist filter, measurement is less than or equal filter, measurement is greater than or equal filter, measurement is between a value, measurement is not between a value, and measurement is within a value range.

58. A method according to claim 55, wherein the set filter is selected form the group consisting of no filter, equal to a selected set, including a selected set or excluding a selected set.

59. A method according to claim 55, wherein the record number filter is selected from the group consisting of no filtering, record number equal to filter, record number greater than filter, record number greater than filter, record number between selected record numbers filter, record number not between selected record numbers filter and record number between a range of values filter.

60. Computer executable software code stored on a computer readable medium, the code for performing post-flight data analysis of aircraft flight data comprising:
   a. code for using recorded flight data containing data for one or more flights of interest;
   b. for one or more flights of interest, code for analyzing the recorded flight data using user defined measurement definitions, said measurement definitions defined by a user prior to analyzing the flight of interest; and
   c. code for saving the results for the flight of interest.

61. Computer executable software code according to claim 60, further comprising:
   a. analyzing the saved results for the flight of interest in the flight analysis database using a different set of user defined measurements; and
   b. saving results using the different set of user defined measurements for the flight of interest in the flight analysis data base.

62. Computer executable software code according to claim 60, wherein the user defined measurement definitions are selected from the group consisting of timepoint definitions, interval definitions, measurement definitions and event definitions.

63. A computer program according to claim 16, wherein the logical aircraft parameter comprises a recorded aircraft parameter.

64. A computer program according to claim 16, wherein the logical aircraft parameter comprises a mathematical formula.

65. A computer program according to claim 16, wherein the logical aircraft parameter is not specified to indicate the logical aircraft parameter does not exist for the specified aircraft type.

66. A computer program according to claim 19, wherein the logical fleet constants comprise a specified value for an aircraft type.

67. A computer program according to claim 19, wherein the logical fleet constants are not specified to indicate the logical fleet constant does not exist for a specified aircraft type.

68. A computer program according to claim 23, wherein the logical fleet constants comprise a specified value for an aircraft type.

69. A computer program according to claim 23, wherein the logical fleet constants are not specified to indicate the logical fleet constant does not exist for a specified aircraft type.

70. A computer program according to claim 32, wherein the logical fleet constants comprise a specified value for an aircraft type.

71. A computer program according to claim 32, wherein the logical fleet constants are not specified to indicate the logical fleet constant does not exist for a specified aircraft type.

72. A computer program, embodied on a computer-readable medium, incorporating the method of claim 1.

* * * * *